United States Patent
Clayton et al.

(10) Patent No.: US 8,883,049 B2
(45) Date of Patent: Nov. 11, 2014

(54) SMALL SCALE MICROENCAPSULATED PIGMENTS AND USES THEREOF

(71) Applicant: Chromatic Technologies, Inc., Colorado Springs, CO (US)

(72) Inventors: Terrill Scott Clayton, Colorado Springs, CO (US); Timothy J. Owen, Colorado Springs, CO (US); Lyle Small, Colorado Springs, CO (US)

(73) Assignee: Chromatic Technologies, Inc., Colorado Springs, CO (US)

( * ) Notice: Subject to any disclaimer, the term of this patent is extended or adjusted under 35 U.S.C. 154(b) by 0 days.

(21) Appl. No.: 13/843,492

(22) Filed: Mar. 15, 2013

(65) Prior Publication Data

US 2014/0272161 A1 Sep. 18, 2014

(51) Int. Cl.
*G02B 5/23* (2006.01)
*C09D 11/30* (2014.01)
*C09D 11/00* (2014.01)

(52) U.S. Cl.
CPC ....................................... *C09D 11/30* (2013.01)
USPC ..................... 252/586; 106/31.13; 106/31.33; 106/31.65; 427/401

(58) Field of Classification Search
USPC .......... 106/31.32, 31.33, 31.64, 31.65, 31.13; 220/626; 427/401; 428/34.1; 523/400, 523/427; 524/300, 556, 560, 590, 599; 252/586

See application file for complete search history.

(56) References Cited

U.S. PATENT DOCUMENTS

| | | | |
|---|---|---|---|
| 4,720,301 A | 1/1988 | Kito et al. | |
| 5,219,625 A | 6/1993 | Matsunami et al. | |
| 5,558,700 A | 9/1996 | Shibahashi et al. | |
| 5,591,255 A | 1/1997 | Small | |
| 5,997,849 A | 12/1999 | Small et al. | |
| 6,132,501 A | 10/2000 | Scaringe et al. | |
| 6,139,779 A | 10/2000 | Small et al. | |
| 6,494,950 B1 | 12/2002 | Fujita et al. | |
| 7,354,962 B1 | 4/2008 | Akers, Jr. et al. | |
| 7,494,537 B2 | 2/2009 | Ono et al. | |
| 2002/0185035 A1* | 12/2002 | Kitagawa et al. | 106/31.32 |
| 2005/0239646 A1* | 10/2005 | Hada et al. | 503/200 |
| 2006/0112851 A1* | 6/2006 | Ono et al. | 106/31.16 |

FOREIGN PATENT DOCUMENTS

JP 08-277373 * 10/1996 ............. C09D 11/02

OTHER PUBLICATIONS

Related U.S. Appl. No. 61/542,738, filed Oct. 3, 2011, complete file history, 60 pages.

* cited by examiner

*Primary Examiner* — Bijan Ahvazi
(74) *Attorney, Agent, or Firm* — Lathrop & Gage LLP

(57) ABSTRACT

A method is provided for making thermochromic pigments in microcapsules having unusually small particle sizes.

21 Claims, 4 Drawing Sheets

SMALL SCALE MICROENCAPSULATED PIGMENTS AND USES THEREOF

FIELD

This disclosure pertains to the field of thermochromic pigment systems. More particularly, these are reversible thermochromic systems having a controllable color transition range across a hysteresis window of the system, as well as photochromic systems and combinations of photochromic and thermochromic systems.

BACKGROUND

Dyes that change color over a range of temperatures are known as thermochromic dyes. Thermochromic dyes can be manufactured to have a color change that is reversible or irreversible. Formulated as pigments or colorants, they are used in a variety of applications such as plastic masterbatch, paper, textiles, coatings, offset ink, metal decorating inks, coatings, ultraviolet radiation curable inks and coatings, solvent based inks and coatings, screen inks and coatings, gravure inks and coatings, paints, security printing, brand protection, smart packaging, marketing and novelty printing, among other uses.

Thermochromic dyes use colorants that are either liquid crystals or leuco dyes. Liquid crystals are used less frequently than leuco dyes because they are very difficult to work with and require highly specialized printing and handling techniques.

Thermochromic dyes are a system of interacting parts. The parts of the system are leuco dyes acting as colorants, weak organic acids acting as color developers and solvents that variably interact with components of the system according to the temperature of the system. Thermochromic dye systems are microencapsulated in a protective coating to protect the contents from undesired effects from the environment. Each microcapsule is self-contained, having all of the components of the entire system required to reproduce the color change. The components of the system interact with one another differently at different temperatures. Generally, the system is ordered and colored below a temperature corresponding to the full color point. The system begins to lose its color at a temperature corresponding to a predetermined activation temperature.

Below the activation temperature, the system is colored and above the activation temperature they are clear or lightly colored. The activation temperature corresponds to a range of temperatures at which the transition is taking place between the full color point and the clearing point. Generally, the activation temperature is defined as the temperature at which the human eye can perceive that the system is starting to lose color, or alternatively, starting to gain color. Presently, thermochromic systems are designed to have activation temperatures over a broad range, from about −20° C. to about 80° C. or higher. With heating, the system becomes increasingly unordered and continues to lose its color until it reaches a level of disorder at a temperature corresponding to a clearing point. At the clearing point, the system lacks any recognizable color.

Specific thermochromic ink formulations are known in the art. See, for example, U.S. Pat. Nos. 4,720,301, 5,219,625 5,558,700, 5,591,255, 5,997,849, 6,139,779, 6,494,950 and 7,494,537, all of which are expressly incorporated herein by reference to the same extent as though fully replicated herein. These thermochromic inks are known to use various components in their formulations, and are generally reversible in their color change. Thermochromic inks are available in various colors, with various activation temperatures, clearing points and full color points. Thermochromic inks may be printed by offset litho, dry offset, letterpress, gravure, flexo and screen processes, amongst others. Thermochromic inks containing leuco dyes are available for all major ink types such as water-based, ultraviolet cured and epoxy. The properties of these inks differ from process inks. For example, most thermochromic inks contain the thermochromic systems as microcapsules, which are not inert and insoluble as are ordinary process pigments. The size of the microcapsules containing the thermochromic systems ranges typically between 3-5 µm which is more than 10-times larger than typical pigment particles as found in most inks. The post-print functionality of thermochromic inks can be adversely affected by ultraviolet light, temperatures in excess of 140° C. and aggressive solvents. The lifetime of these inks is sometimes very limited because of the degradation caused by exposure to ultraviolet light from sunlight. Thus, there is a need in the art for thermochromic systems in inks and coatings having resistance to degradation from exposure to ultraviolet light.

Temperature changes in thermochromic systems are associated with color changes. If this change is plotted on a graph having axes of temperature and color, the curves do not align and are offset between the heating cycle and the cooling cycle. The entire color versus temperature curve has the form of a loop. See generally FIG. 1A where the extent of color change presents a gap 100a that differs between color change that occurs upon heating 102 versus cooing 103. FIG. 1B presents a relatively larger gap 100b. Such a result shows that the color of a thermochromic system does not depend only on temperature, but also on the thermal history, i.e. whether the particular color was reached during heating or during cooling. This phenomenon is generally referred to as a hysteresis cycle and specifically referred to herein as color hysteresis or the hysteresis window. Decreasing the width of this hysteresis window to approximately zero would allow for a single value for the full color point and a single value for the clearing point. This would allow for a reliable color transition to be observed regardless of whether the system is being heated or cooled. Nonetheless, the concept of decreasing separation across the hysteresis window is elusive in practice. The extent of the respective gaps 100a, 100b to produce controlled hysteresis may be practiced according to the instrumentalities described herein.

Prior art reveals that the color transition range of microencapsulated thermochromic systems may be adjusted by shifting the full color point upward toward the clearing point, or shifting the clearing point downward toward the full color point, as explained in U.S. Pat. No. 4,028,118 issued to Norikazu et al. See also EP0480162 to Masayasu et al. These shifts are accomplished by adding high melting point materials to increase the full color point or, alternatively, by adding low melting point materials to the system to decrease the clearing point. Thus, the full color point or clearing point may be lowered or raised, but the overall temperature range between the two points remains unchanged because the amount of separation or width across the hysteresis window is left largely unaffected.

In recent years, metal decoration inks have been adapted for use or thermochromic pigments in high speed commercial canning operations. In one example of this, a thermochromic pigment may be formulated to use melamine formaldehyde microcapsules having an average diameter from 3 to 5 microns. This is poorly suited for use as a metal decoration ink for high speed application to a metal can where the line speed of the can coater may be greater than 1000 or 2000 cans per minute. The use of thermochromic metal decorating ink increasingly becomes a limiting factor at higher production line speeds. Problems arise in the ink rheology with this particle size that leads to misting as the ink is transferred at very high speed.

Presently, the use of thermochromic pigments in inkjet inks is not possible because creating particles sizes below one micron has not been possible. The larger particles interfere with the inks in the intended environment of use.

SUMMARY

The presently disclosed instrumentalities overcome the problems outlined above and advance the art by providing a process for producing large batches of encapsulated slurries with much smaller particle size. These smaller capsules, for example, may be described in various ways. The pigments have Gaussian distributed particle diameters primarily ranging from about 400 nm to 1.5 microns plus or minus 10%. By way of example, 70% of the total volume of microcapsules may be are of sub-micron dimensions and about 90% are less than 1.5 microns. The pigments may also been described as having mean particle diameter, as assessed by volume of particle, of less than 1 micron. These calculations assume spherical particles.

These pigments may be used to make inks that show considerably less misting and better transfer to metal cans at high production line speeds, such as speeds exceeding 1000, 1500, or 2000 cans per minute.

The small particle size also facilitates the commercial use of thermochromic pigments in systems where larger particle size is problematic. By way of example, printed images may now be provided with finer lines, sharper definition and improved color density than was previously possible when using thermochromic inks. Thermochromic pigments may now be used in ink jet printing applications.

In one aspect, the present disclosure addresses microencapsulated pigment formulations and processing for preparing compositions that may be used in inkjet printing applications.

In one aspect, the present disclosure addresses microencapsulated pigment formulations and processing for preparing compositions that may be used to improve performance in offset printing processes.

In an embodiment, these microcapsules are made of a cured amine formaldehyde resin, and the wall encapsulates an internal phase including a thermochromic system or a photochromic material. These pigments may be dispersed in an ink vehicle that tis used for printing, such as a conventional ink vehicle or carrier as may be used in offset litho, dry offset, letterpress, gravure, flexo and screen processes. The ink may also be an inkjet ink. These pigments may also be dispersed in vehicles or carriers for coatings. Metal decoration coatings where the pigment is dispersed in a curable synthetic resin are particularly preferred. By way of example, the microencapsulation techniques are compatible with thermochromic systems that achieve a blue color when in a color-activated state. This color may alternatively be any other color known to be achieved by thermochromic systems, such as green, yellow, black or cyan, as well as mixtures of these colors.

In one aspect, these advantages are achieved by improving conventional microencapsulation processes by using a sufficient amount of surfactant dispersed in water to emulsify an internal phase to dimensions such that upon completing a subsequent step of microencapsulating the internal phase with a cured resin the resulting slurry contains microcapsules that have a mean by volume particle size diameter of less than 1 micron. The surfactant may be cationic, nonionic or anionic. The surfactant, is for example, an anionic surfactant such as maleic anhydride and/or a substituted derivative thereof.

In one aspect, the slurry for microencapsulation is prepared by successively combining under agitation: (1) an aqueous phase solution constituting from 40% to 70% of the slurry by weight, where from 1% to 10% of the aqueous phase solution is an anionic surfactant; (2) an internal phase mixture constituting from 23% to 35% of the slurry by weight, where from 1% to 10% by weight of the internal phase is a leuco dye and from 5% to 30% is a developer for the leuco dye; (3) an amine formaldehyde resin solution constituting from 15% to 28% of the slurry by weight of which from 40% to 60% is the amine formaldehyde resin itself; and optionally (4) an accelerator for curing the amine formaldehyde resin.

DEFINITIONS

Thermochromic system—A mixture of dyes, developers, solvents, and additives (encapsulated or non-encapsulated) that can undergo reversible or semi-irreversible color change in response to temperature changes.

Full color point—The temperature at which a thermochromic system has achieved maximum color density upon cooling and appears to gain no further color density if cooled to a lower temperature.

Activation temperature—The temperature above which the ink has almost achieved its final clear or light color end point. The color starts to fade at approximately 4° C. below the activation temperature and will be in between colors within the activation temperature range.

Clearing point—The temperature at which the color of a thermochromic system is diminished to a minimal amount and appears to lose no further color density upon further heating.

Hysteresis—The difference in the temperature profile of a thermochromic system when heated from the system when cooled.

Hysteresis window—The temperature difference in terms of degrees that a thermochromic system is shifted as measured between the derivative plot of chroma of a spectrophotometer reading between the cooling curve and the heating curve.

Leuco dye—A leuco dye is a dye whose molecules can acquire two forms, one of which is colorless.

DETAILED DESCRIPTION

Conventional thermochromic systems are prepared by combining a color forming molecule or molecules such as leuco dyes that are capable of extended conjugation by proton gain or electron donation; a color developer or developers that donate a proton or accept an electron; and a single solvent or a blend of co-solvents. The solvent or blend of co-solvents are chosen based on melting point and establish the thermochromic temperature range of the system. These formulations form an internal phase that is then microencapsulated within a polymeric shell. The microcapsules are referred to as thermochromic pigment.

The processing outlined below may be used to produce microcapsules of much smaller dimensions than are obtainable from the prior art. By way of example, these smaller capsules may have an average particle diameter that ranges from 400 nm to 1.5 microns. In fact, substantially all particles, such as more than 95% or more than 90% of all particles, may be smaller than 1.5 microns. If necessary, larger particles resulting from the process may be removed by labyrinth or depth filters. This results in particle size distributions that are substantially smaller than the smallest distributions obtainable from the prior art.

Figure 4:
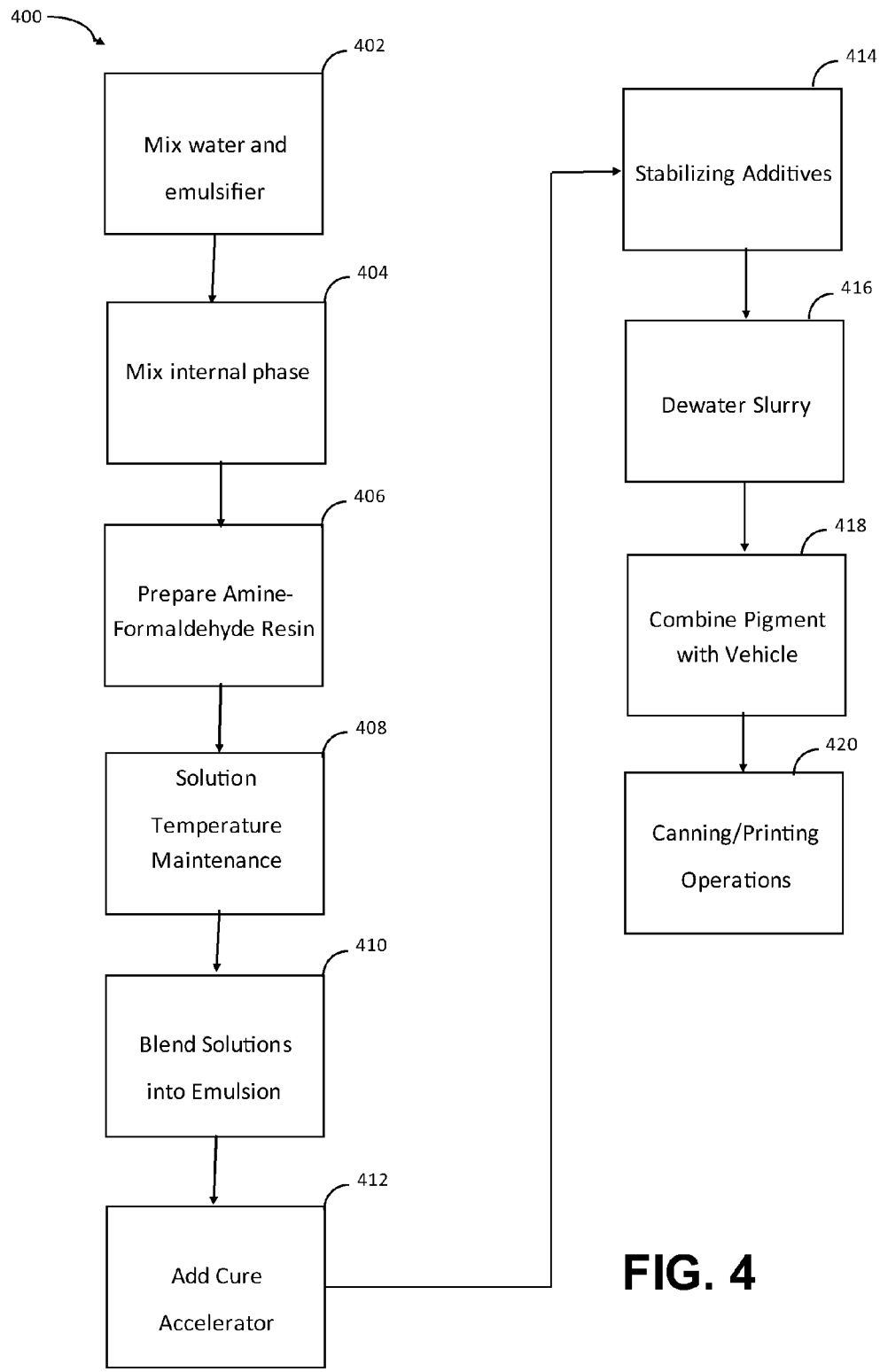
FIG. 4 is a process diagram that shows a process of making thermochromic pigments having very small particle diameters.

As shown in FIG. 4, process 400 utilizes unique chemistry to produce a reactive pigment that may be dispersed in a polyester resin ink vehicle. An emulsion mixture used to form the microcapsules may be formulated as premixtures in three parts.

Step 402 entails mixing an emulsifier into an aqueous solution that contains water and optionally other polar solvents that are miscible with water. Water is the preferred solvent. This is mixed to substantial homogeneity with a surfactant material that is used as an emulsifier or emulsion stabilizer. The emulsifier may suitably include, for example, nonionic, anionic, cationic, or zwitterionic surfactants, polymers or copolymers, or reactive diluents such as aliphatic or cycloaliphatic glycidyl ethers. Anionic surfactants are preferred. The art sometimes refers to these materials as anionic protective colloids. These are used to or disperse fine droplets of hydrophobic liquid in an aqueous medium, for keeping the dispersed droplets from aggregation or unification. Useful materials for the formation of anionic protective colloids for such a purpose are anionic polymers, which are exemplified by polystyrenesulfonate, styrene copolymers, polyvinylsulfonatester salts, polyvinylsulfonates, maleic anhydridestyrene copolymer, maleic anhydride-isobutylene copolymer, maleic anhydride-ethylene copolymer, maleic anhydride-methyl vinyl ether copolymer, polyvinyl alcohol (saponified product), carboxymethyl-modified polyvinyl alcohol, gum arabic, polyacrylates, polyacrylate derivatives, acrylate copolymers, carboxymethyl cellulose, gelatin, pectin, pullulan, phtahalated gelatin, succinated gelatin, other gelatin derivatives, cellulose sulfate ester salt, and alginic acid.

The anionic emulsifiers are particularly preferred. By way of example, the anionic emulsifier ethylene maleic anhydride (EMA) is suitably used, as are homologues of EMA. These materials may be pH adjusted using an amine, such as triethanolamine. For example, one useful surfactant material is hydrolyzed ethylene maleic anhydride adjusted to a pH of around 4.0 with triethnolamine. This first premixture according to step 402 preferably constitutes from 40% to 70% by weight of the final emulsion mixture, with about 50% w/w being used in a working example below. From 1% to 10% by weight of the aqueous solution suitably contains an anionic surfactant used as the emulsifier, with significant reductions in particle size being obtainable when the amount of surfactant provided is sufficient to impart more than 2% by weight of the surfactant in the final emulsion slurry where microencapsulation is to be performed. The amount of anionic surfactant in this final slurry is preferably from 2% to 7% by weight, with from 2.3% to 6% being more preferred and 2.5% to 5% being even more preferred and 2.5% to 3% being most preferred. Water may comprise the balance of the aqueous solution.

Step 404 entails mixing an internal phase mixture that constitutes any of the internal phase materials described below and is generally insoluble with the aqueous phase. These materials are combined to form thermochromic systems using ratios of ingredients as are known in the art. Although there may be additional additives as described below, the essential internal phase components include a leuco dye, a developer for the leuco dye, and a carrier such as a microcrystalline wax which may alternatively be an ester, ketone, and/or alcohol. The internal phase mixture constitutes from 23% to 35% by weight of the emulsion mixture, with 30% by weight being used in a working example below.

Step 406 entails preparing an amine-formaldehyde resin solution. This is preferably of the class known as having high amine content, as this increases solubility of the resin in water. This is mixed with water or another compatible polar solvent, preferably in an amount where the water ranges from 40% to 60% of the amine formaldehyde resin solution. The amine formaldehyde solution preferably constitutes from 15% to 28% by weight of the emulsion mixture or slurry, with 20% being used in a working example below.

The foregoing premixtures are maintained 408 at respective temperature profiles to facilitate further mixing under conditions of high shear mixing. The aqueous solution is maintained at a temperature ranging from 70° C. to 80° C. For example, this may be done in a reaction vessel that is jacketed for temperature control. The amine-formaldehyde resin solution is maintained at a temperature ranging from 20° C. to 50° C. The internal phase mixture including leuco dye, developer, and carrier is maintained at a temperature of 120° C. to 130° C., or another temperature as may be required as is sufficient to liquefy the carrier.

The respective solutions are blended 410 to form an emulsion. In a preferred mixing order, the internal phase solution is poured into the aqueous solution under high shear conditions created by a homogenizer, such as a rotor/stator that is submerged in the emulsification solution. The entire volume of the internal phase is introduced under a controlled timed pour based on batch size. The high shear homogenizer runs until the internal phase produces an oil-in-water emulsion that facilitates particle sizes of the desired distribution. Once the emulsion is generated, the amine-formaldehyde solution is poured under a controlled time condition while the homogenizer rapidly disperses the wall forming pre-polymer. At the end of the resin addition, the homogenizer is shut down and removed from the process. A large impeller type mixer is then engaged in the slurry to keep the capsules suspended while the capsule walls form. This is done while maintaining a temperature of 70° C. to 90° C., most preferably 80° C.

Once a stable emulsion of the desired particle size is created while the polymer wall is forming, a catalyst for polymerizing the resin is optionally added 412. The resin may be combined with one or more known catalysts to initiate polymerization. Certain curing agents may be added to quicken the cure rate of the amine formaldehyde resin without permanently activating the thermochromic system.

Suitable cure accelerators or catalysts include, but are not limited to, imidazoles, amidoamines, linear phenolics, blocked and unblocked acid catalysts, isocyanates, dihydrazides or photoinitiators and dodecylbenzenesulfonic acid. In one preferred embodiment, the curing agent is dodecylbenzenesulfonic acid. Suitable curing agents include at least the following acid catalyst curing agents, for example: A 40S; ABS 100; Ambicat LE 4476; B 121; B 121 (also a surfactant);

Bio-Soft S 100; Bio-Soft S 101; Biosoft S 126; Calsoft LAS 99; Cat 6000; Catalyst 600; Catalyst 6000; Cycat 600; DBS; Dobanic acid; Dodecylbenzenesulphonic acid; E 7256; Elfan WA Sulphonic Acid; LAS 99; laurylbenzenesulfonic acid; Lipon LH 500; Maranil DBS; Marlon AS 3; Nacconol 98SA; Nacure 5074; Nacure 5076; Nansa 1042; Nansa 1042P; Nansa SSA; Neopelex FS; Neopelex GS; Neopelex GS-P; P 3 Vetralat; Pelex F 25; Polystep A 13; Rhodacal SSA/A; Richonic Acid B; S 100; Soft Osen 5S; Sulfosoft; Sulframin 1298; Sulframin Acid 1298; Taycacure AC 430; Taycapower L 120D; Taycapower L 121; Taycapower L 122; Ufacid K; Witco 1298; Witco 1298 Acid Soft; Witco 1298 Soft Acid; Witconic 1298 Hard Acid; Witconic 1298 Soft Acid; blocked or unblocked acid catalysts; Decotherm 255e, Nacure 2500, cycat 4040, cycat 4045, cycat 600, paratoluene sulfonic acid, amine blocked paratoluenesulfonic acid; and n-dodecylbenzenesulfonic acid. For small microcapsules, p-toluene sulfonic acid catalysts are particularly preferred, and amine-blocked p-toluene sulfonic acid catalysts are especially preferred.

In the case of a toluene sulfonic acid catalyst, this is added at 5% to 30% by weight of the amine formaldehyde resin. The pH is adjusted to about 4 by addition of an amine, such as triethnolamine. Under the high temperature and low pH, the amine formaldehyde resin will polymerize and accumulate as the capsule wall around the internal phase. The resin wall will further crosslink into a hardened shell over a period of 2-8 hours while the polymerization reaction occurs at a temperature from 80° C. to 90° C. The use of an amine blocked toluene sulfonic acid enhances the capsule wall density making the microcapsules more chemically resistant.

At this time, a stabilizing agent is optionally added 414. The stabilizing agent may be a metallocene catalyst or transition metal bonded to organic moieties through oxygen linkages. Preferred forms of the stabilizing agent are transition metal soaps, or any other carboxylic acid salt including a catalytic metal-oxygen moiety. The organic tail of these preferred materials improves solubility and dispersion. Zirconium 2-ethylhexanoate is particularly preferred. This additive interacts with the surface of the polymerized microcapsules to protect the thermochromic functionality thereof when the pigment is mixed with inks or coatings. In one aspect, Formula (I) below shows the structure of a carboxylate salt that may be used as described herein:

$$M^n(R)n;$$

where M is a metal as described above of oxidation state n; and R is a carboxylate having a carbon number ranging from five to fourteen. M is preferably a transition metal. R is preferably a branched derivative of hexanoic acid, such as 2-ethyl hexanoate.

In another aspect, a metallocene catalyst may be provided with transition metals bonded to oxygen, nitrogen, and/or halogen atoms.

After polymerization, the slurry will have a high kinematic viscosity ranging from 2000 to 4000 centipoise. The slurry is approximately 40% by weight solids including capsules and other materials, together with approximately 60% water. In order to produce a metal decoration ink, the bulk of the water needs to be removed from the liquid slurry, thus reducing the amount of water from 60% by weight percentage to a percentage of from 20%-40% by weight.

The dewatering step 416 is accomplished by filtering the slurry using a mesh filter. This may be facilitated by positive pressure or under vacuum, as well as by chemical additives as are known in the art. Further dewatering may be accomplished by introducing the filtered slurry into a jacketed vacuum mixer which will maintains a high temperature under vacuum with continuous mixing.

The final dewatered pigment is then be suitable for processing into a metal decorating ink that can withstand a high temperature oven cure without extreme color loss, and will also have improved transfer rheology without severe misting. The resulting pigment may be mixed with a vehicle 418 to form a coating or ink for printing. This may be used 420 in canning or printing operations, or any other application for thermochromic pigments.

The discussion that follows describes a variety of materials which are useful in the forgoing process.

Internal Phase Components

*Photochromic Dyes

Photochromic dyes may be used as the internal phase. Known classes of photochromic dyes include, without limitation, spiropyrans, spirooxazines diarylethenes, azobenzenes, and photochromic quinones.

*Leuco Dyes

Leuco dyes most commonly used as color formers in thermochromic systems of the present disclosure include, but are not limited to, generally; spirolactones, fluorans, spiropyrans, and fulgides; and more specifically; diphenylmethane phthalide derivatives, phenylindolylphthalide derivatives, indolylphthalide derivatives, diphenylmethane azaphthalide derivatives, phenylindolylazaphthalide derivatives, fluoran derivatives, styrynoquinoline derivatives, and diaza-rhodamine lactone derivatives which can include: 3,3-bis(p-dimethylaminophenyl)-6-dimethylaminophthalide; 3-(4-diethylaminophenyl)-3-(1-ethyl-2-methylindol-3-yl) phthalide; 3,3-bis(1-n-butyl-2-methylindol-3-yl)phthalide; 3,3-bis(2-ethoxy-4-diethylaminophenyl)-4-azaphthalide; 3-[2-ethoxy-4-(N-ethylanilino)phenyl]-3-(1-ethyl-2-methylindol-3-yl)-4-azaphthalide; 3,6-dimethoxyfluoran; 3,6-di-n-butoxyfluoran; 2-methyl-6-(N-ethyl-N-p-tolylamino)fluoran; 3-chloro-6-cyclohexylaminofluoran; 2-methyl-6-cyclohexylaminofluoran; 2-(2-chloroanilino)-6-di-n-butylamino fluoran; 2-(3-trifluoromethylanilino)-6-diethylaminofluoran; 2-(N-methylanilino)-6-(N-ethyl-N-p-tolylamino) fluoran, 1,3-dimethyl-6-diethylaminofluoran; 2-chloro-3-methyl-6-diethylamino fluoran; 2-anilino-3-methyl-6-diethylaminofluoran; 2-anilino-3-methyl-6-di-n-butylamino fluoran; 2-xylidino-3-methyl-6-diethylaminofluoran; 1,2-benzo-6-diethylaminofluoran; 1,2-benzo-6-(N-ethyl-N-isobutylamino)fluoran, 1,2-benzo-6-(N-ethyl-N-isoamylamino)fluoran; 2-(3-methoxy-4-dodecoxystyryl)quinoline; spiro[5H-(1)benzopyrano(2,3-d)pyrimidine-5,1'(3'H) isobenzofuran]-3'-one; 2-(diethylamino)-8-(diethylamino)-4-methyl-spiro[5H-(1)benzopyrano(2,3-d)pyrimidine-5,1' (3'H)isobenzofuran]-3'-one; 2-(di-n-butylamino)-8-(di-n-butylamino)-4-methyl-spiro[5H-(1)benzopyrano(2,3-d) pyrimidine-5,1'(3'H)isobenzofuran]-3'-one; 2-(di-n-butylamino)-8-(diethylamino)-4-methyl-spiro[5H-(1) benzopyrano(2,3-d)pyrimidine-5,1'(3'H)isobenzofuran]-3'-one; 2-(di-n-butylamino)-8(N-ethyl-N-isoamylamino)-4-methyl-spiro[5H-(1)benzopyrano(2,3-d)pyrimidine-5,1' (3' H)isobenzofuran]-3'-one; and 2-(di-n-butylamino)-8-(di-n-butylamino)-4-phenyl and trisubstituted pyridines.

Particularly preferred materials for use as chromatic compounds are of diphenylmethane phthalide derivatives, phenylindolylphthalide derivatives, indolylphthalide derivatives, diphenylmethane azaphthalide derivatives, phenylindolylazaphthalide derivatives, fluoran derivatives, styrynoquinoline derivatives, 2,4,6, trisubstituted pyridines, quinazolines, bis-quinazolines, and diaza-rhodamine lactone derivatives, in any combination.

Specific examples of 2,4,6 trisubstituted pyridine dyes are described in detail in copending U.S. patent application Ser. No. 61/542,738 filed Oct. 3, 2011, which is hereby incorporated by reference to the same extent as though fully replicated herein. Compounds 1-45 below are dyes that exemplify these materials and may be used in any combination.
1
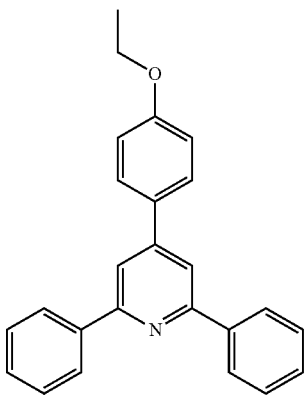
2
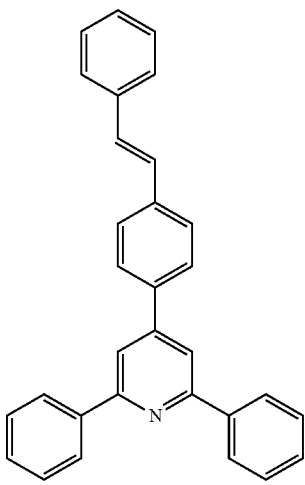
3
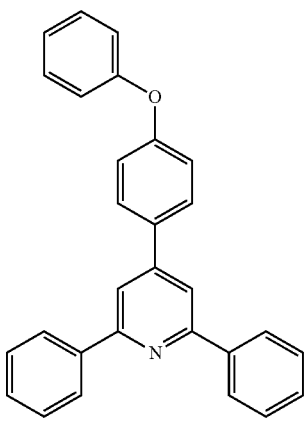
4
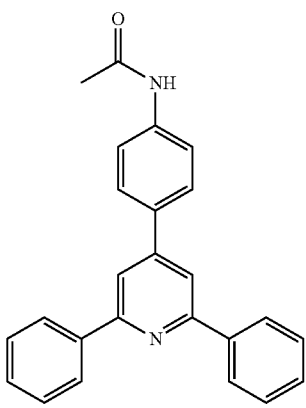
5
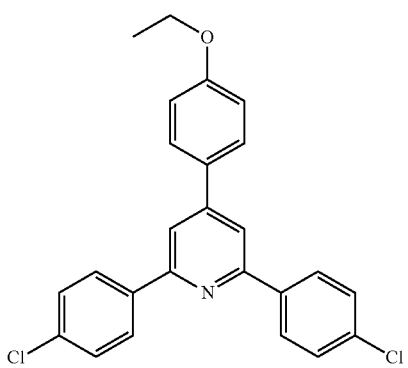
6
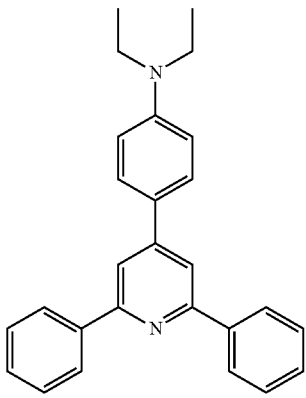
7
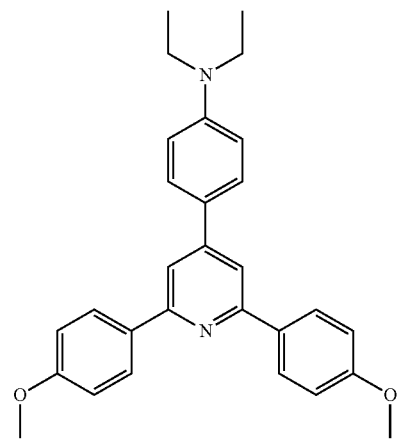

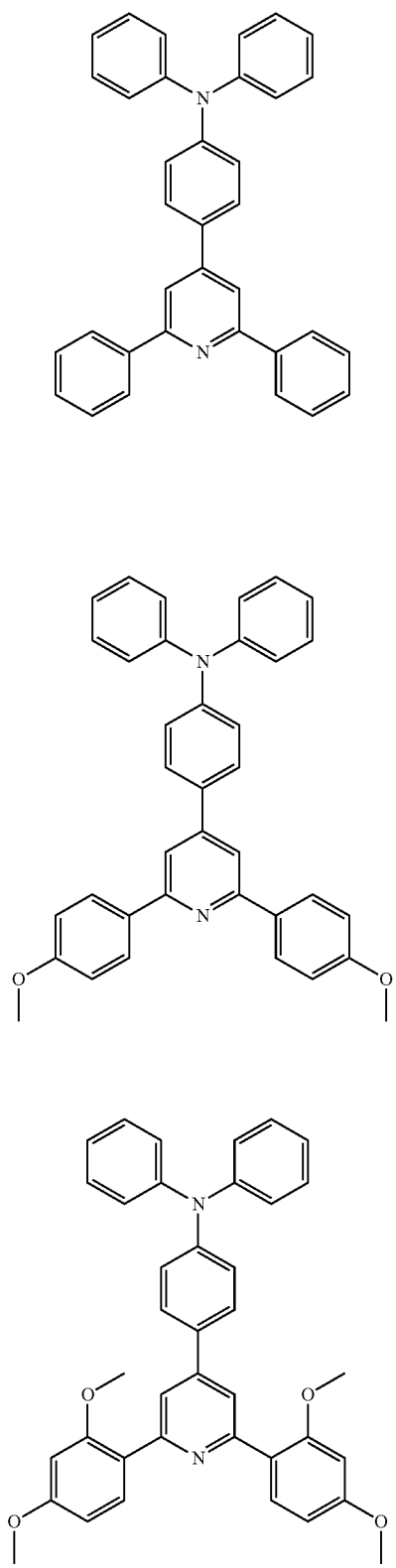
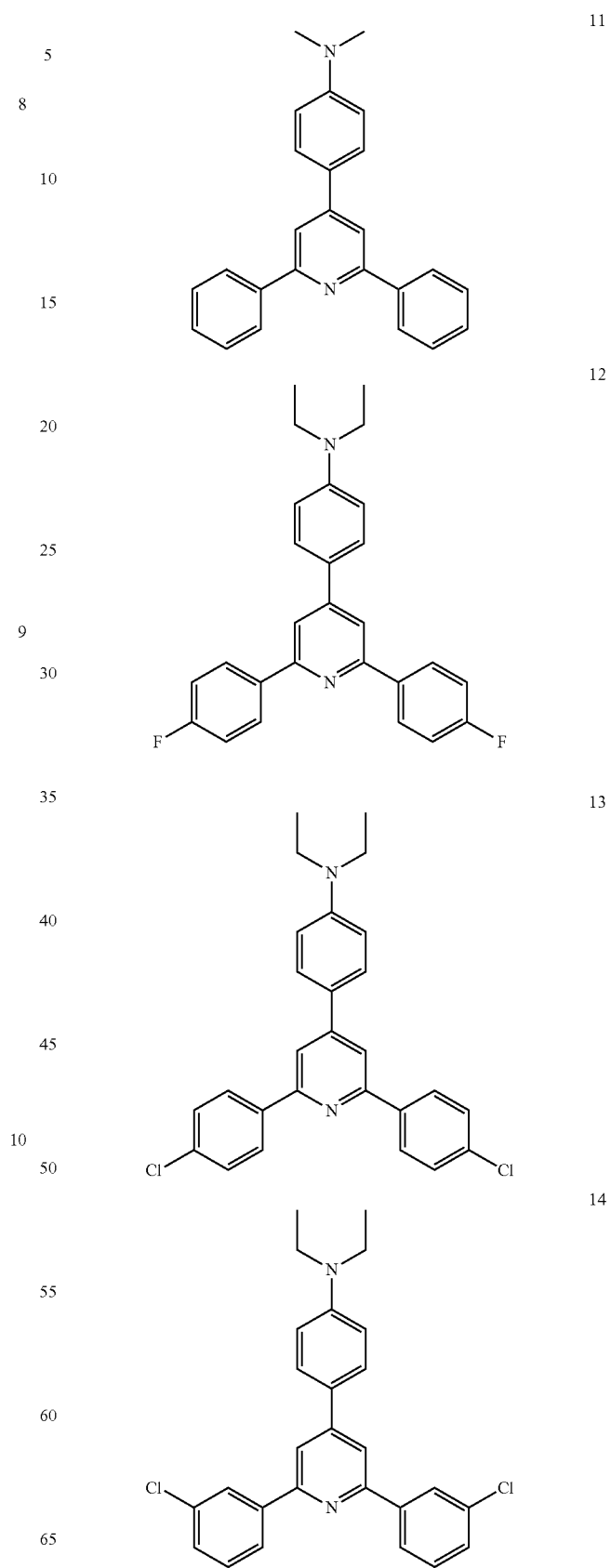

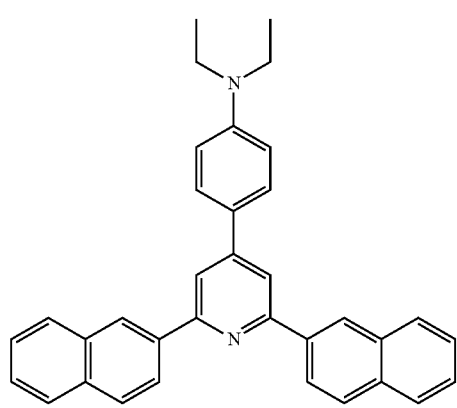
15
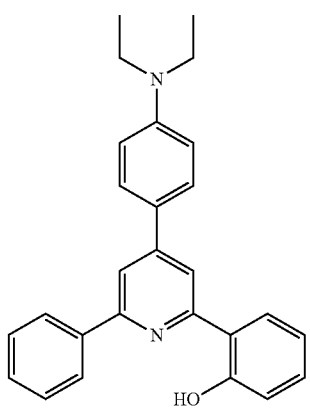
19
16
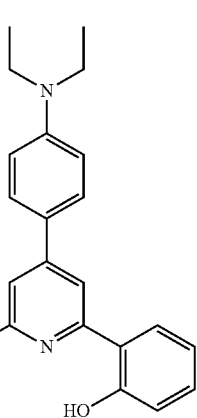
20
17
18
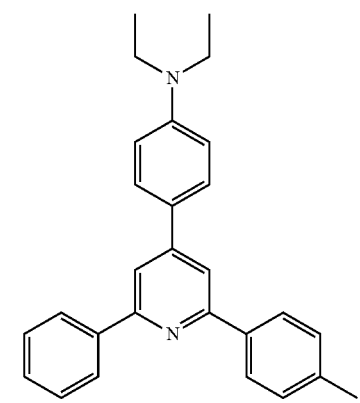
21
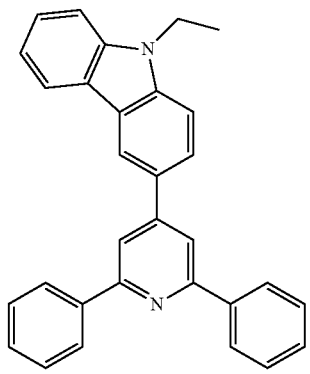
22

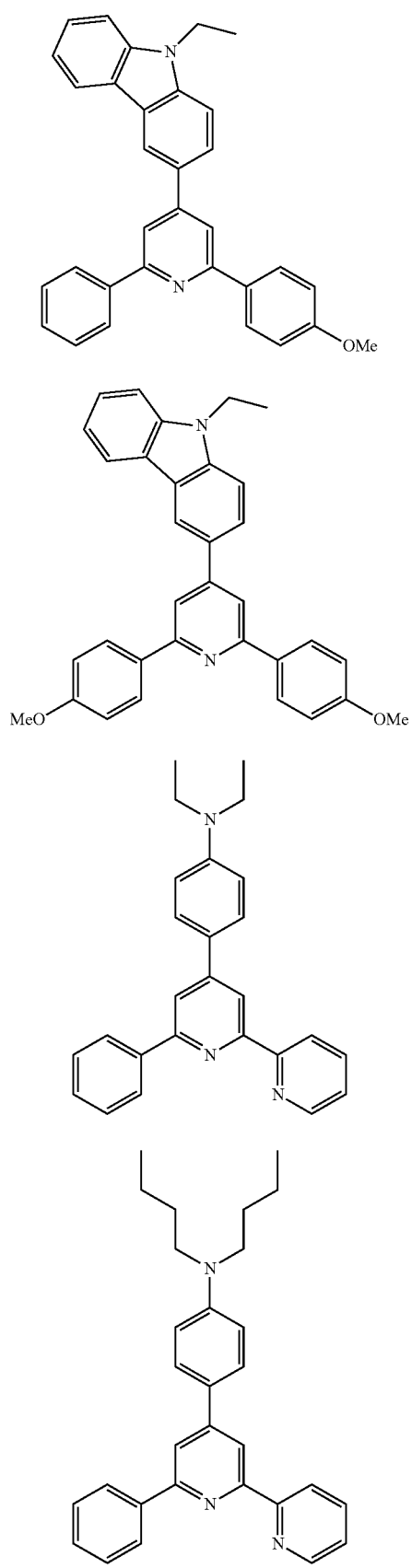
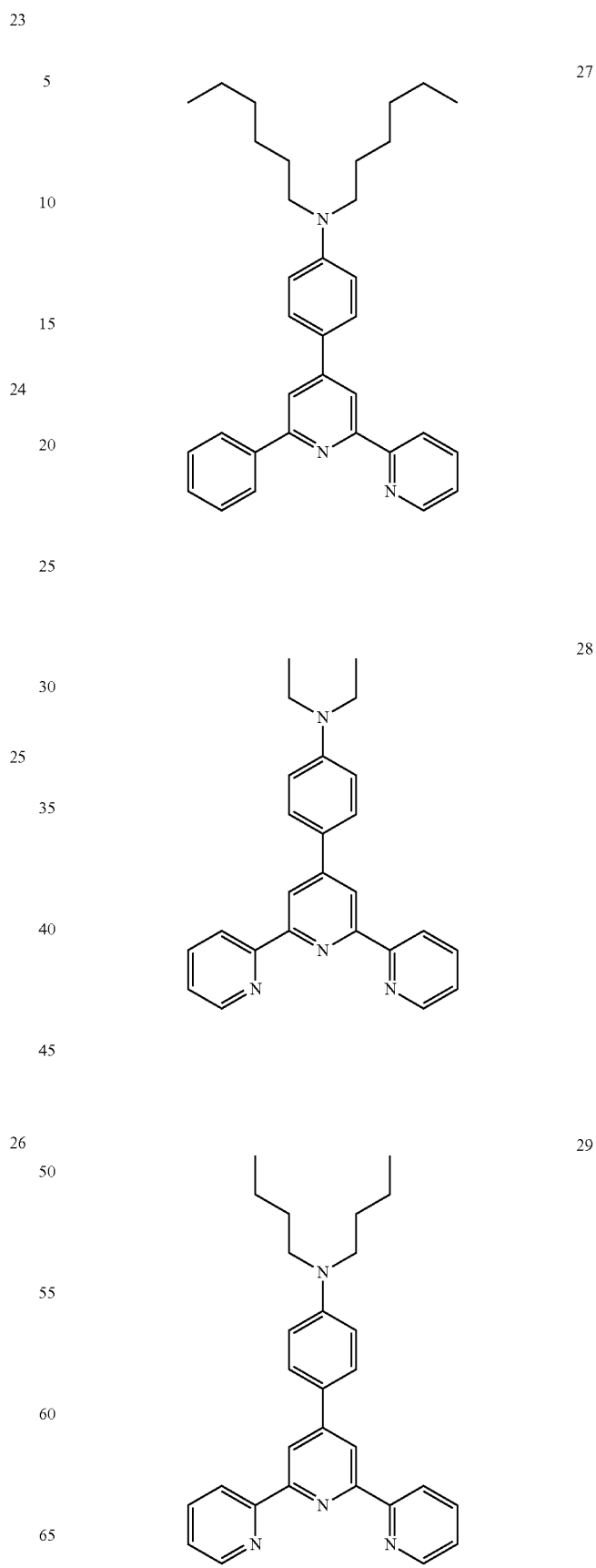

30
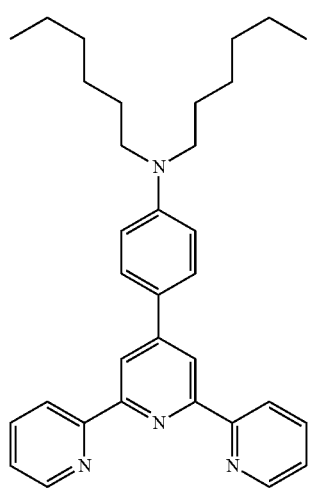
31
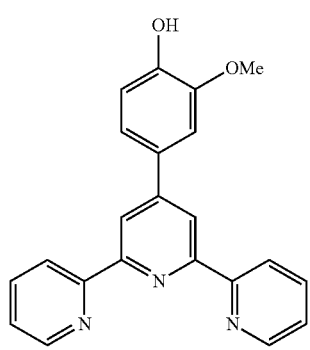
32
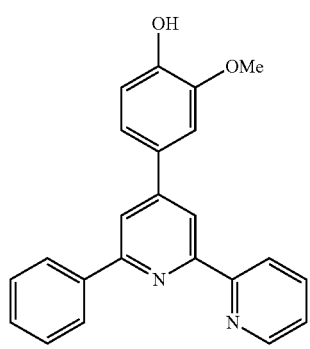
33
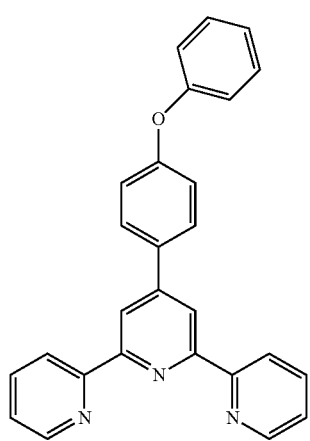
34
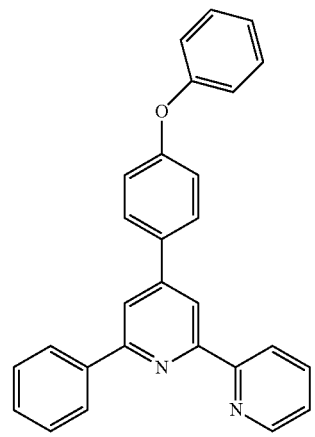
35
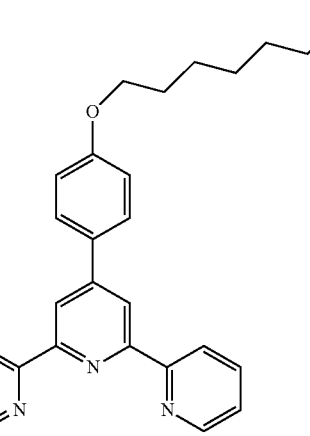
36
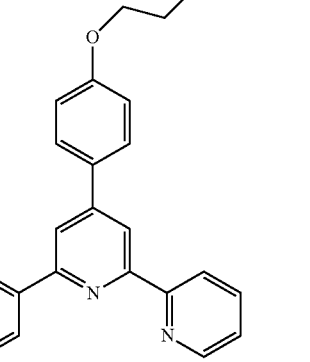

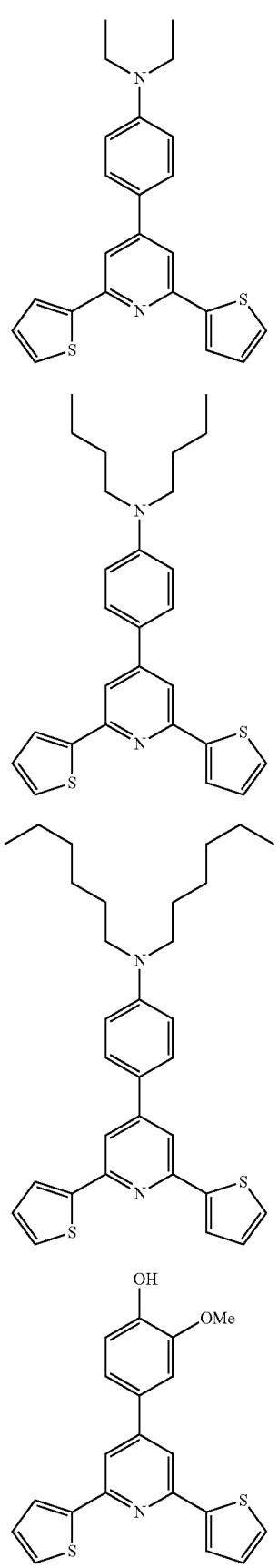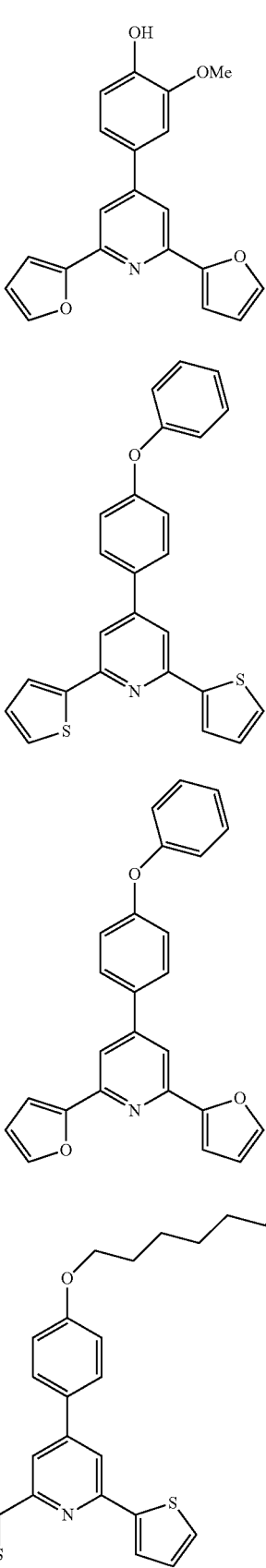

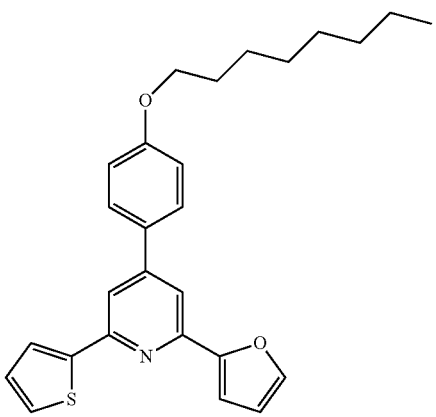

4,4'-dialkyl-2,2'-biphenol,
4,4'-dichloro, difluoro, dibromo, diiodo-2,2'-biphenol,
4,4'-dicarboalkoxy-2,2'-biphenol, and
4,4'-diacetyl, dibenzoyl-2,2'-biphenol and 5-alkyl-salicylic acid.

*Developers

Weak acids that can be used as color developers act as proton donors, changing the dye molecule between its leuco form and its protonated colored form; stronger acids make the change irreversible. Examples of developers used in the present disclosure include but are not limited to: bisphenol A; bisphenol F; tetrabromobisphenol A; 1'-methylenedi-2-naphthol; 1,1,1-tris(4-hydroxyphenyl)ethane; 1,1-bis(3-cyclohexyl-4-hydroxyphenyl)cyclohexane; 1,1-bis(4-hydroxy-3-methylphenyl)cyclohexane; 1,1-bis(4-hydroxyphenyl)cyclohexane; 1,3-bis[2-(4-hydroxyphenyl)-2-propyl]benzene; 1-naphthol; 2-naphthol; 2,2 bis(2-hydroxy-5-biphenylyl)propane; 2,2-bis(3-cyclohexyl-4-hydroxy)propane; 2,2-bis(3-sec-butyl-4-hydroxyphenyl)propane; 2,2-bis(4-hydroxy-3-isopropylphenyl)propane; 2,2-bis(4-hydroxy-3-methylphenyl)propane; 2,2-bis(4-hydroxyphenyl)propane; 2,3,4-trihydroxydiphenylmethane; 4,4'-(1,3-Dimethylbutylidene)diphenol; 4,4'-(2-Ethylidene)diphenol; 4,4'-(2-hydroxybenzylidene)bis(2,3,6-trimethylphenol); 4,4'-biphenyl; 4,4'-dihydroxydiphenyl ether; 4,4'-dihydroxydiphenylmethane; 4,4'-methylidenebis(2-methylphenol); 4-(1,1,3,3-tetramethylbutyl)phenol; 4-phenylphenol; 4-tert-butylphenol; 9,9-bis(4-hydroxyphenyl)fluorine; 4,4'-(ethane-1,1-diyfldiphenol; alpha,alpha'-bis(4-hydroxyphenyl)-1,4-diisopropylbenzene; alpha,alpha,alpha'-tris(4-hydroxyphenyl)-1-ethyl-4-isopropylbenzene; benzyl 4-hydroxybenzoate; bis(4-hydroxyphenyl)sulfide; bis(4-hydroxyphenyl)sulfone; propyl 4-hydroxybenzoate; methyl 4-hydroxybenzoate; resorcinol; 4-tert-butyl-catechol; 4-tert-butyl-benzoic acid; 1,1'-methylenedi-2-naphthol 1,1,1-tris(4-hydroxyphenyl)ethane; 1,1-bis(3-cyclohexyl-4-hydroxyphenyl)cyclohexane; 1,1-bis(4-hydroxy-3-methylphenyl)cyclohexane; 1,1-bis(4-hydroxyphenyl)cyclohexane; 1,3-bis[2-(4-hydroxyphenyl)-2-propyl]benzene; 1-naphthol 2,2'-biphenol; 2,2-bis(2-hydroxy-5-biphenylyl)propane; 2,2-bis(3-cyclohexyl-4-hydroxyphenyl)propane; 2,2-bis(3-sec-butyl-4-hydroxyphenyl)propane; 2,2-bis(4-hydroxy-3-isopropylphenyl)propane; 2,2-bis(4-hydroxy-3-methylphenyl)propane; 2,2-bis(4-hydroxyphenyl)propane; 2,3,4-trihydroxydiphenylmethane; 2-naphthol; 4,4'-(1,3-dimethylbutylidene)diphenol; 4,4'-(2-ethylhexylidene)diphenol 4,4'-(2-hydroxybenzylidene)bis(2,3,6-trimethylphenol); 4,4'-biphenyl; 4,4'-dihydroxydiphenyl ether; 4,4'-dihydroxydiphenylmethane; 4,4'-ethylidenebisphenol; 4,4'-methylenebis(2-methylphenol); 4-(1,1,3,3-tetramethylbutyl)phenol; 4-phenylphenol; 4-tert-butylphenol; 9,9-bis(4-hydroxyphenyl)fluorine; alpha,alpha'-bis(4-hydroxyphenyl)-1,4-diisopropylbenzene; α,α,α-tris(4-hydroxyphenyl)-1-ethyl-4-isopropylbenzene; benzyl 4-hydroxybenzoate; bis(4-hydroxyphenyl)sulfidem; bis(4-hydroxyphenyl)sulfone methyl 4-hydroxybenzoate; resorcinol; tetrabromobisphenol A; derivative salts of salicylic acid such as 3,5-di-tertbutyl-salicylic acid; zinc 3,5-di-tertbutylsalicylate; 3-phenyl-salicylic acid; 5-tertbutyl-salicylic acid; 5-n-octyl-salicylic acid; 2,2'-biphenol; 4,4'-di-tertbutyl-2,2'-biphenol; 4,4'-di-n-alkyl-2,2'-biphenol; and 4,4'-di-halo-2,2'-biphenol, wherein the halo is chloro, fluoro, bromo, or iodo.

Specific examples of known leuco dye developers are shown below:

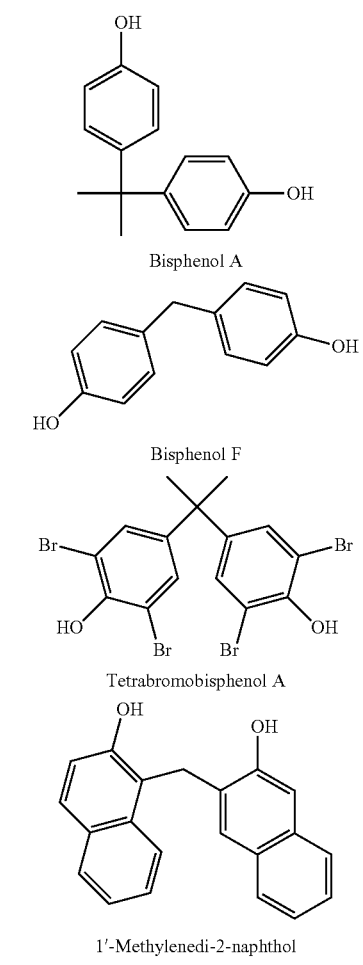

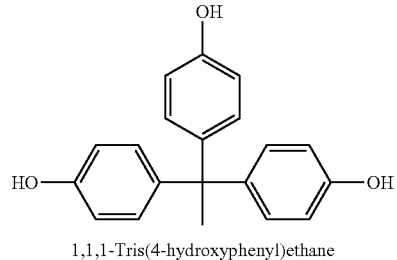

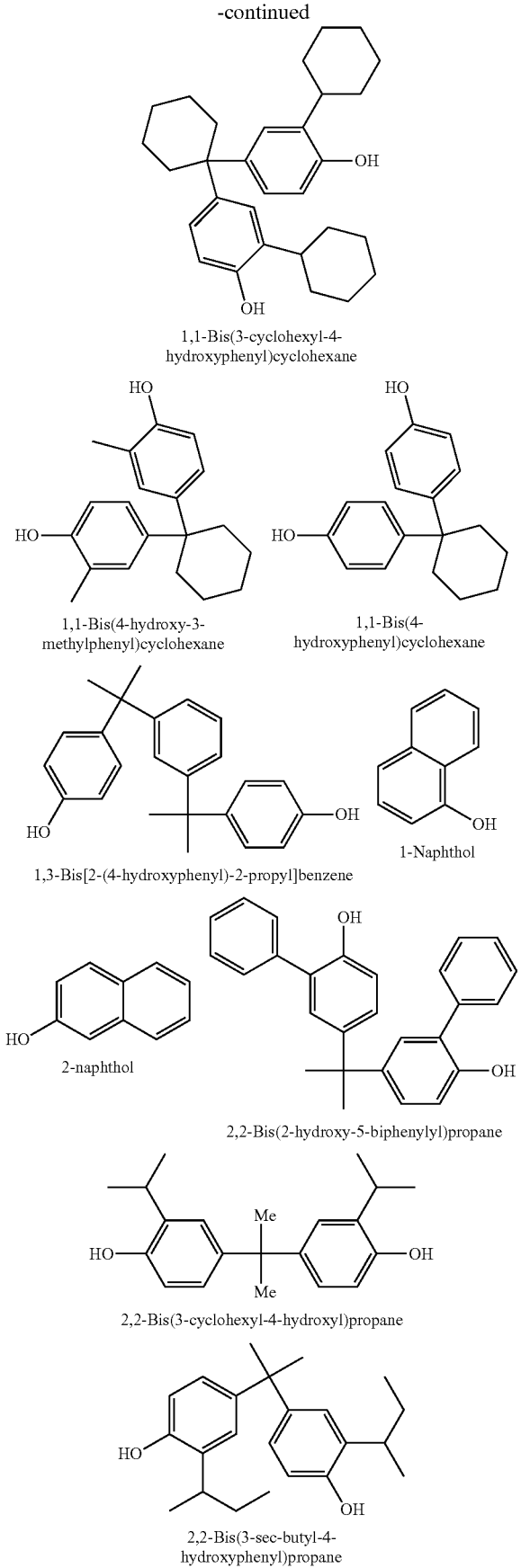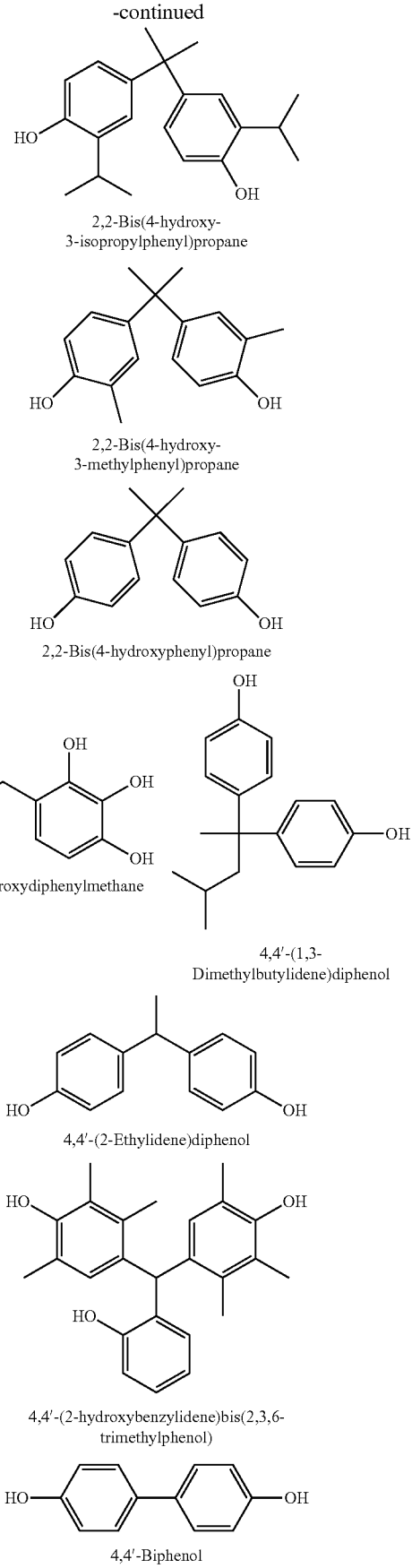

Figure 1A:
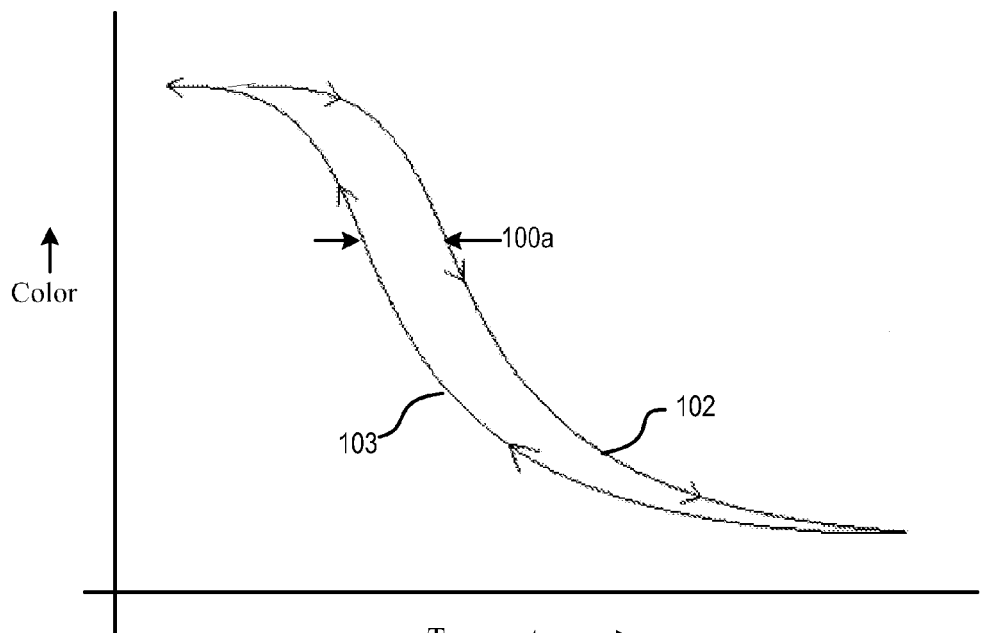
FIG. 1 shows generally the effect of controlling color hysteresis in a thermochromic system where FIG. 1A has a narrower hysteresis gap than does FIG. 1B.
Figure 1B:
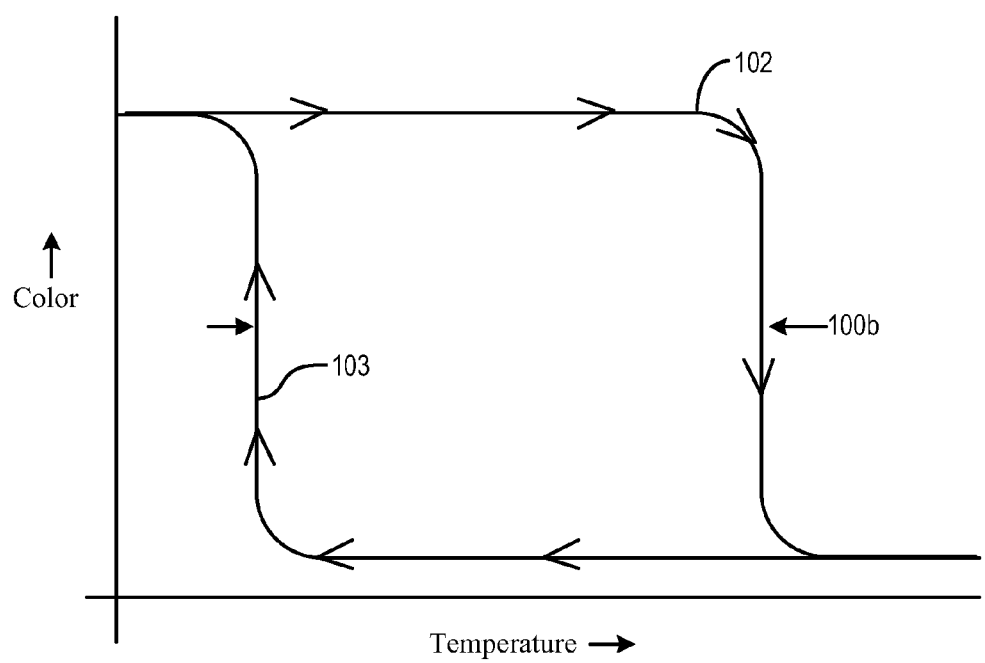
Figure 2:
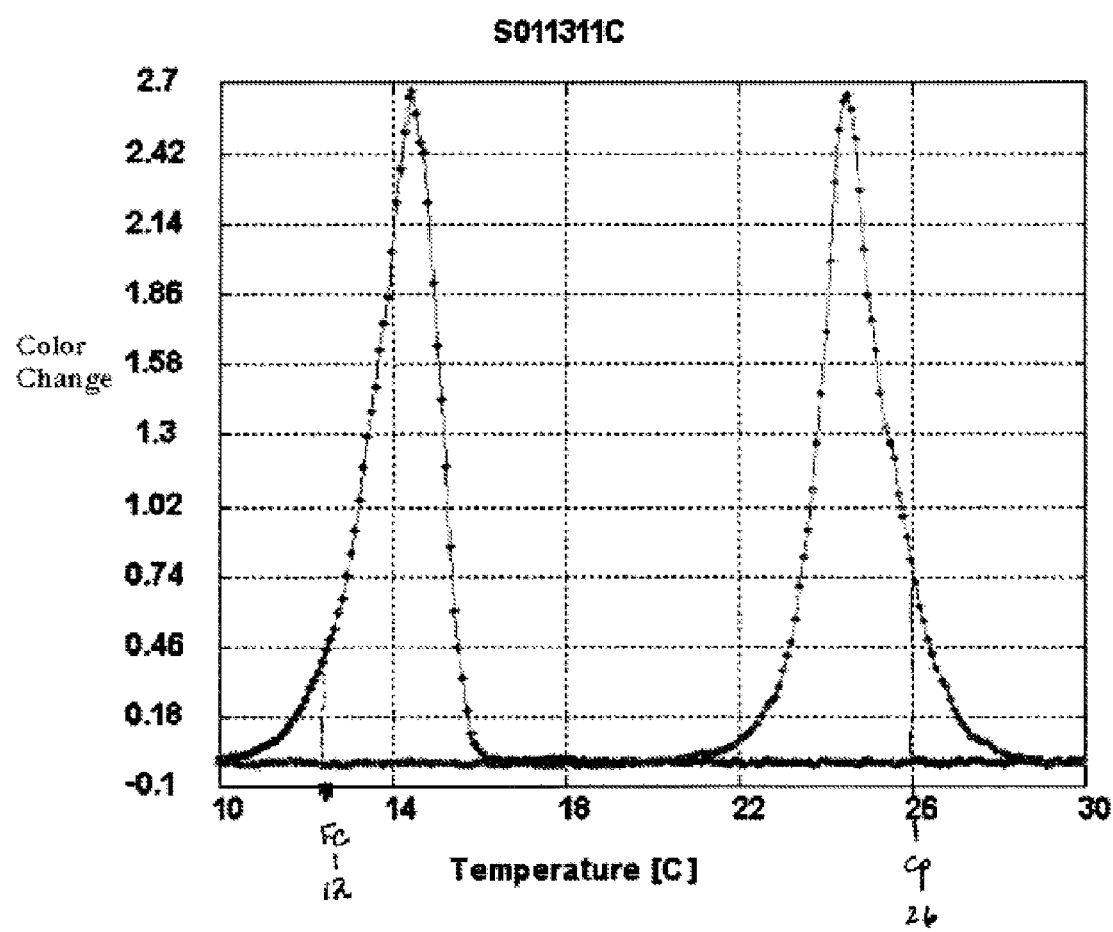
FIG. 2 is a plot of color change versus temperature for a reversible thermochromic dye.
Figure 3:
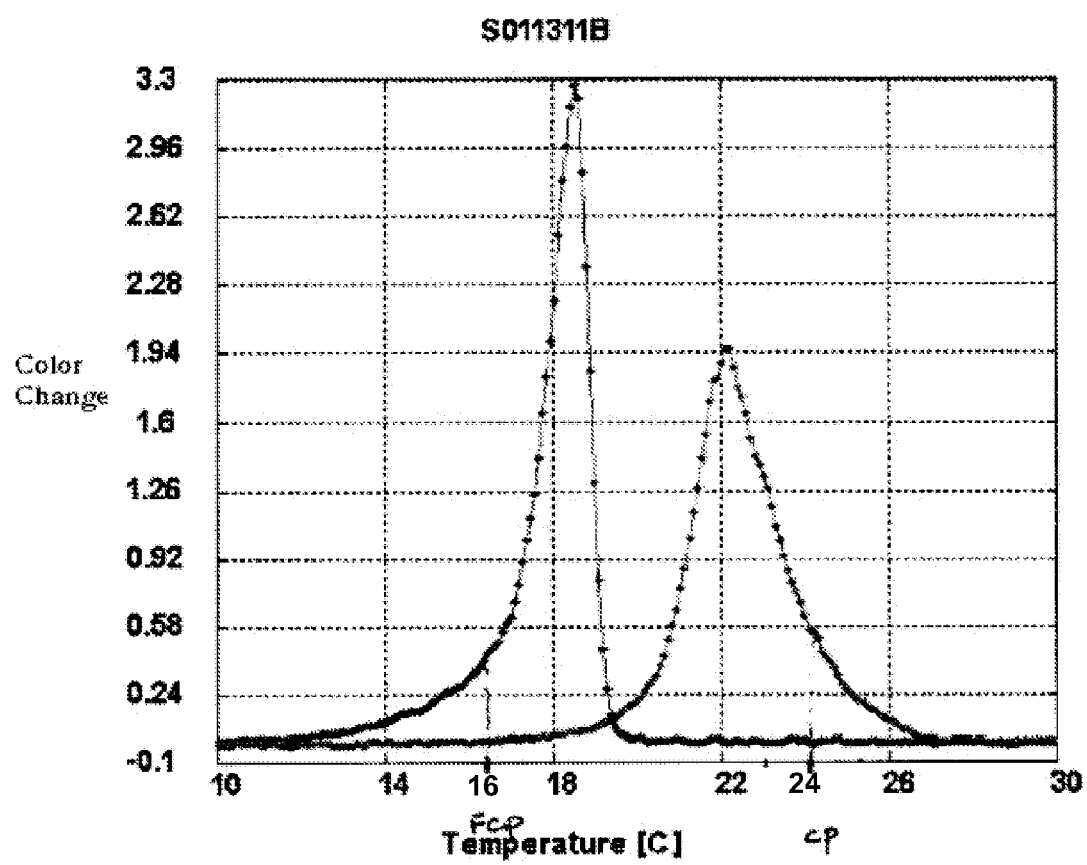
FIG. 3 is a plot of color change versus temperature for a reversible thermochromic dye.

Structures shown (left column):
- 4,4'-Dihydroxydiphenyl Ether
- 4,4'-Dihydroxydiphenylmethane
- 4,4'-Ethylidenebisphenol
- 4,4'-Methylidenebis(2-methylphenol)
- 4-(1,1,3,3-Tetramethylbutyl)phenol
- 4-Phenylphenol
- 4-tert-Butylphenol
- 9,9-Bis(4-hydroxyphenyl)fluorine
- Alpha,alpha'-Bis(4-hydroxyphenyl)-1,4-diisopropylbenzene Structures shown (right column):
- Alpha,alpha,alpha'-Tris(4-hydroxyphenyl)-1-ethyl-4-isopropylbenzene
- Benzyl 4-Hydroxybenzoate
- Bis(4-hydroxyphenyl)Sulfide
- Bis(4-hydroxyphenyl)sulfone
- Propyl 4-Hydroxybenzoate
- Methyl 4-Hydroxybenzoate
- Resorcinol
- 4-Tert-butyl-catechol
- 4-Tert-butyl-benzoic acid The leuco dyes are combined with leuco dye developers for making thermochromic compositions. These materials are found to generate absorption densities from the leuco dyes when formulated with a carrier that contains one or more fatty ester, fatty alcohol, and fatty amide. The combination of leuco dyes, developers and carrier materials may be used in any combination to achieve the listed functionalities. By way of example, this combination of molecules includes any combination of the following molecules: bipyridyl and terpyridine leuco dyes of the type 2-[2-pyridyl]-6-phenyl-4-dialkylamino-pyridine, 2-[2-pyridyl]-6-phenyl-4-diarylamino-pyridine, 2-[2-pyridyl]-6-phenyl-4-hydroxy-pyridine, 2-[2-pyridyl]-6-[2-pyridyl]-4-dialkylamino-pyridine, 2-[2-pyridyl]-6-[2-pyridyl]-4-diarylamino-pyridine, 2-[2-pyridyl]-6-[2- pyridyl]-4-hydroxy-pyridine, molecules from FIG. 3 including at least the following; 26, 27, 29, 30, 31, 32, 33, 34, 35, 36, 38, 39, 41, 42, and 43; also 2,6-diphenyl-4-dialkylamino-pyridines, 2,6-diphenyl-4-diarylamino-pyridines, 2,6-diphenyl-4-hydroxy-pyridines, 2,6-diphenyl-4-alkoxy-pyridines, 2,6-diphenyl-4-aryloxy-pyridines, molecules from FIG. 3 including at least the following; 1, 3, 5, 6, 7, 8, 9, 10, 13, 17, 19, 20, 21, 22, 23, 24; and 4,4'-dialkyl-2,2'-biphenol, 4,4'-dichloro, difluoro, dibromo, diiodo-2,2'-biphenol, 4,4'-dicarboalkoxy-2,2'-biphenol, 4,4'-diacetyl, dibenzoyl-2,2'-biphenol as well as salicylic acids including at least 5-alkyl-salicylic acid.

Furthermore the composition so obtained may be encapsulated in a separate composition, such as a melamine-formaldehyde resin, to produce absorption changing pigments designed for use in formulated ink and coating products as well as plastic pellet concentrates for injection molded or extruded plastic products.

Some materials function as both leuco dyes and light absorbers:

Visible Range Absorbers (400 nm to 700 nm):

4-(4'-dimethylamino-phenyl)-2,6-diphenyl-pyridine (dye 11)

4-(4'-diphenylamino-phenyl)-2,6-diphenyl-pyridine (dye 3)

Near UVA Range absorbers:

4-(4-ethoxy-phenyl)-2,6-diphenyl-pyridine (dye 1).

4-(4-phenoxy-phenyl)-2,6-diphenyl-pyridine (dye 3).

These developers are particularly preferred for use with the 2,4,6 tri-substituted pyridine dyes

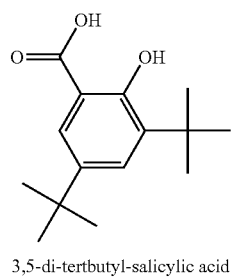

3,5-di-tertbutyl-salicylic acid

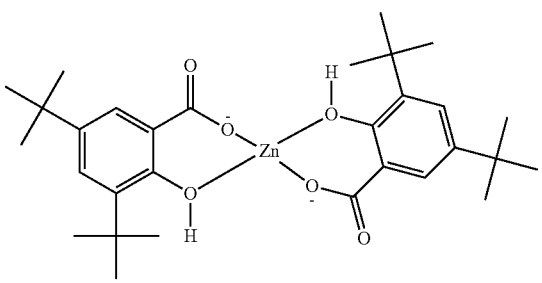

Zn 3,5-di-tertbutylsalicylate

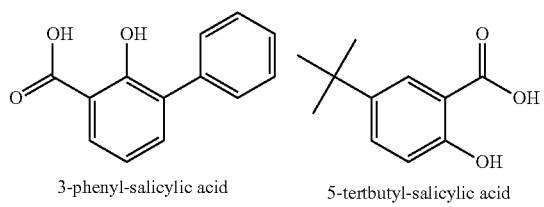

3-phenyl-salicylic acid     5-tertbutyl-salicylic acid

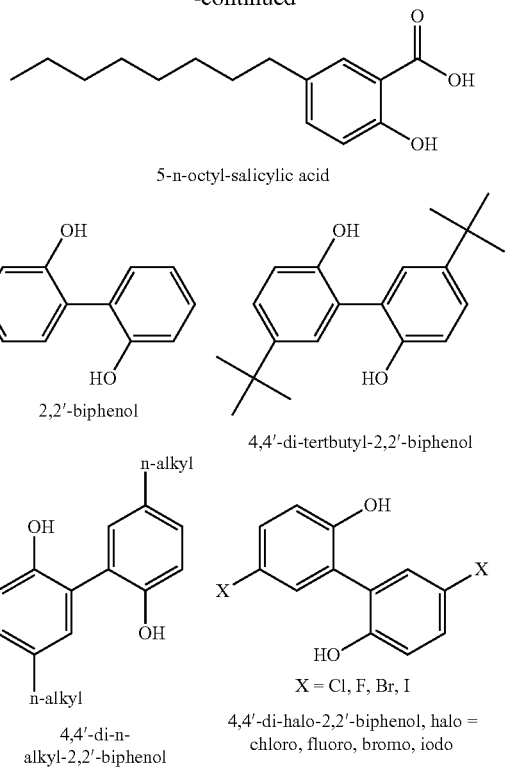

5-n-octyl-salicylic acid 2,2'-biphenol 4,4'-di-tertbutyl-2,2'-biphenol 4,4'-di-n-alkyl-2,2'-biphenol 4,4'-di-halo-2,2'-biphenol, halo = chloro, fluoro, bromo, iodo X = Cl, F, Br, I

*Carriers/Solvents for the Internal Phase

The best solvents to use within the thermochromic system are those that have low reactivity, have a relatively large molecular weight (i.e. over 100), and which are relatively non-polar. Ketones, diols and aromatic compounds should not be used as solvents within the internal phase or thermochromic system.

Solvents and/or co-solvents used in thermochromic systems generally may include, but are not limited to: aldehydes, thiols, sulfides, ethers, ketones, esters, alcohols, and acid amides. These solvents can be used alone or in mixtures of 2 or more. Examples of the sulfides include, but are not limited to: di-n-octyl sulfide; di-n-nonyl sulfide; di-n-decyl sulfide; di-n-dodecyl sulfide; di-n-tetradecyl sulfide; di-n-hexadecyl sulfide; di-n-octadecyl sulfide; octyl dodecyl sulfide; diphenyl sulfide; dibenzyl sulfide; ditolyl sulfide; diethylphenyl sulfide; dinaphthyl sulfide; 4,4'-dichlorodiphenyl sulfide; and 2,4,5,4' tetrachlorodiphenyl sulfide. Examples of the ethers include, but are not limited to: aliphatic ethers having 10 or more carbon atoms, such as dipentyl ether, dihexyl ether, diheptyl ether, dioctyl ether, dinonyl ether, didecyl ether, diundecyl ether, didodecyl ether, ditridecyl ether, ditetradecyl ether, dipentadecyl ether, dihexadecyl ether, dioctadecyl ether, decanediol dimethyl ether, undecanediol dimethyl ether, dodecanediol dimethyl ether, tridecanediol dimethyl ether, decanediol diethyl ether, and undecanediol diethyl ether; alicyclic ethers such as s-trioxane; and aromatic ethers such as phenylether, benzyl phenyl ether, dibenzyl ether, di-p-tolyl ether, 1-methoxynaphthalene, and 3,4,5-trimethoxytoluene.

Examples of ketone solvents include, but are not limited to: aliphatic ketones having 10 or more carbon atoms, such as 2-decanone, 3-decanone, 4-decanone, 2-undecanone, 3-undecanone, 4-undecanone, 5-undecanone, 6-undecanone, 2-dodecanone, 3-dodecanone, 4-dodecanone, 5-dodecanone, 2-tridecanone, 3-tridecanone, 2-tetradecanone, 2-pentadecanone, 8-pentadecanone, 2-hexadecanone, 3-hexadecanone, 9-heptadecanone, 2-pentadecanone, 2-octadecanone, 2-nonadecanone, 10-nonadecanone, 2-eicosanone, 11-eicosanone, 2-heneicosanone, 2-docosanone, laurone, and stearone; aryl alkyl ketones having 12 to 24 carbon atoms, such as n-octadecanophenone, n-heptadecanophenone, n-hexadecanophenone, n-pentadecanophenone, n-tetradecanophenone, 4-n-dodecaacetophenone, n-tridecanophenone, 4-n-undecanoacetophenone, n-laurophenone, 4-n-decanoacetophenone, n-undecanophenone, 4-n-nonylacetophenone, n-decanophenone, 4-n-octylacetophenone, n-nonanophenone, 4-n-heptylacetophenone, n-octanophenone, 4-n-hexylacetophenone, 4-n-cyclohexylacetophenone, 4-tert-butylpropiophenone, n-heptaphenone, 4-n-pentylacetophenone, cyclohexyl phenyl ketone, benzyl n-butyl ketone, 4-n-butylacetophenone, n-hexanophenone, 4-isobutylacetophenone, 1-acetonaphthone, 2-acetonaphthone, and cyclopentyl phenyl ketone; aryl aryl ketones such as benzophenone, benzyl phenyl ketone, and dibenzyl ketone; and alicyclic ketones such as cyclooctanone, cyclododecanone, cyclopentadecanone, and 4-tert-butylcyclohexanone, ethyl caprylate, octyl caprylate, stearyl caprylate, myristyl caprate, stearyl caprate, docosyl caprate, 2-ethylhexyl laurate, n-decyl laurate, 3-methylbutyl myristate, cetyl myristate, isopropyl palmitate, neopentyl palmitate, nonyl palmitate, cyclohexyl palmitate, n-butyl stearate, 2-methylbutyl stearate, stearyl behenate 3,5,5-trimethylhexyl stearate, n-undecyl stearate, pentadecyl stearate, stearyl stearate, cyclohexylmethyl stearate, isopropyl behenate, hexyl behenate, lauryl behenate, behenyl behenate, cetyl benzoate, stearyl p-tert-butylbenzoate, dimyristyl phthalate, distearyl phthalate, dimyristyl oxalate, dicetyl oxalate, dicetyl malonate, dilauryl succinate, dilauryl glutarate, diundecyl adipate, dilauryl azelate, di-n-nonyl sebacate, 1,18-dineopentyloctadecylmethylenedicarboxylate, ethylene glycol dimyristate, propylene glycol dilaurate, propylene glycol distearate, hexylene glycol dipalmitate, 1,5-pentanediol dimyristate, 1,2,6-hexanetriol trimyristate, 1,4-cyclohexanediol didecanoate, 1,4-cyclohexanedimethanol dimyristate, xylene glycol dicaprate, and xylene glycol distearate.

Without limitation, ester solvents may be selected from esters of a saturated fatty acid with a branched aliphatic alcohol, esters of an unsaturated fatty acid or a saturated fatty acid having one or more branches or substituents with an aliphatic alcohol having one or more branches or 16 or more carbon atoms, cetyl butyrate, stearyl butyrate, and behenyl butyrate including 2-ethylhexyl butyrate, 2-ethylhexyl behenate, 2-ethylhexyl myristate, 2-ethylhexyl caprate, 3,5,5-trimethylhexyl laurate, butyl palmitate, 3,5,5-trimethylhexyl palmitate, 3,5,5-trimethylhexyl stearate, 2-methylbutyl caproate, 2-methylbutyl caprylate, 2-methylbutyl caprate, 1-ethylpropyl palmitate, 1-ethylpropyl stearate, 1-ethylpropyl behenate, 1-ethylhexyl laurate, 1-ethylhexyl myristate, 1-ethylhexyl palmitate, 2-methylpentyl caproate, 2-methylpentyl caprylate, 2-methylpentyl caprate, 2-methylpentyl laurate, 2-methylbutyl stearate, 2-methylbutyl stearate, 3-methylbutyl stearate, 2-methylheptyl stearate, 2-methylbutyl behenate, 3-methylbutyl behenate, 1-methylheptyl stearate, 1-methylheptyl behenate, 1-ethylpentyl caproate, 1-ethylpentyl palmitate, 1-methylpropyl stearate, 1-methyloctyl stearate, 1-methylhexyl stearate, 1,1dimethylpropyl laurate, 1-methylpentyl caprate, 2-methylhexyl palmitate, 2-methylhexyl stearate, 2-methylhexyl behenate, 3,7-dimethyloctyl laurate, 3,7-dimethyloctyl myristate, 3,7-dimethyloctyl palmitate, 3,7-dimethyloctyl stearate, 3,7-dimethyloctyl behenate, stearyl oleate, behenyl oleate, stearyl linoleate, behenyl linoleate, 3,7-dimethyloctyl erucate, stearyl erucate, isostearyl erucate, cetyl isostearate, stearyl isostearate, 2-methylpentyl 12-hydroxystearate, 2-ethylhexyl 18-bromostearate, isostearyl 2-ketomyristate, 2-ethylhexyl-2-fluoromyristate, cetyl butyrate, stearyl butyrate, and behenyl butyrate.

Examples of the alcohol solvents include, without limitation, monohydric aliphatic saturated alcohols such as decyl alcohol, undecyl alcohol, dodecyl alcohol, tridecyl alcohol, tetradecyl alcohol, pentadecyl alcohol, hexadecyl alcohol, heptadecyl alcohol, octadecyl alcohol, eicosyl alcohol, behenyl alcohol and docosyl alcohol; aliphatic unsaturated alcohols such as allyl alcohol and oleyl alcohol, alicyclic alcohols such as cyclopentanol, cyclohexanol, cyclooctanol, cyclododecanol, and 4-tert-butylcyclohexanol; aromatic alcohols such as 4-methylbenzyl alcohol and benzhydrol; and polyhydric alcohols such as polyethylene glycol. Examples of the acid amides include, but are not limited to: acetamide, propionamide, butyramide, capronamide, caprylamide, capric amide, lauramide, myristamide, palmitamide, stearamide, behenamide, oleamide, erucamide, benzamide, capronanilide, caprylanilide, capric anilide, lauranilide, myristanilide, palmitanilide, stearanilide, behenanilide, oleanilide, erucanilide, N-methylcapronamide, N-methylcaprylamide, N-methyl(capric amide), N-methyllauramide, N-methylmyristamide, N-methylpalmitamide, N-methylstearamide, N-methylbehenamide, N-methyloleamide, N-methylerucamide, N-ethyllauramide, N-ethylmyristamide, N-ethylpalmitamide, N-ethylstearamide, N-ethyloleamide, N-butyllauramide, N-butylmyristamide, N-butylpalmitamide, N-butylstearamide, N-butyloleamide, N-octyllauramide, N-octylmyristamide, N-octylpalmitamide, N-octylstearamide, N-octyloleamide, N-dodecyllauramide, N-dodecylmyristamide, N-dodecylpalmitamide, N-dodecylstearamide, N-dodecyloleamide, dilauroylamine, dimyristoylamine, dipalmitoylamine, distearoylamine, dioleoylamine, trilauroylamine, trimyristoylamine, tripalmitoylamine, tristearoylamine, trioleoylamine, succinamide, adipamide, glutaramide, malonamide, azelamide, maleamide, N-methylsuccinamide, N-methyladip amide, N-methylglutaramide, N-methylmalonamide, N-methylazelamide, N-ethylsuccinamide, N-ethyladipamide, N-ethylglutaramide, N-ethylmalonamide, N-ethylazelamide, N-butylsuccinamide, N-butyladipamide, N-butylglutaramide, N-butylmalonamide, N-octyladipamide, and N-dodecyladipamide.

Certain solvents reduce the hysteresis window. The solvent may be material combined with the thermochromic system, for example, to reduce thermal separation across the hysteresis window to a level demonstrating 80%, 70%, 50%, 40%, 30% or less of the thermal separation that would exist if the co-solvent were not present. The co-solvent is selected from the group consisting of derivatives of mysristic acid, derivatives of behenyl acid, derivatives of palmytic acid and combinations thereof. Generally, these materials include myristates, palmitates, behenates, together with myristyl, stearyl, and behenyl materials and certain alcohols. In one aspect, these materials are preferably solvents and co-solvents from the group including isopropyl myristate, isopropyl palmitate, methyl palmitate, methyl stearate, myristyl myristate, cetyl alcohol, stearyl alcohol, behenyl alcohol, stearyl behenate, and stearamide. These co-solvents are added to the encapsulated thermochromic system in an amount that, for example, ranges from 9% to 18% by weight of the thermochromic system as encapsulated, i.e., excluding the weight of the capsule. This range is more preferably from about 12% to about 15% by weight.

*Light Stabilizers

In other instances, additives used to fortify the encapsulated thermochromic systems by imparting a resistance to degradation by ultraviolet light by have a dual functionality of also reducing the with of separation over the hysteresis window. Light stabilizers are additives which prevent degradation of a product due to exposure to ultraviolet radiation. These compounds may include blocked phenols, singlet oxygen quenchers, UVA/B absorbers, borotriazoles, and hindered amino light stabilizers (HALS). Specific examples of light stabilizers used in thermochromic systems of the present disclosure and which may also influence the hysteresis window include but are not limited to: avobenzone, bisdisulizole disodium, diethylaminohydroxybenzoyl hexyl benzoate, Ecamsule, methyl anthranilate, 4-aminobenzoic acid, Cinoxate, ethylhexyl triazone, homosalate, 4-methylbenzylidene camphor, octyl methoxycinnamate, octyl salicylate, Padimate O, phenylbenzimidazole sulfonic acid, polysilicone-15, trolamine salicylate, bemotrizinol, benzophenones 1-12, dioxybenzone, drometrizole trisiloxane, iscotrizinol, octocrylene, tetrakis-(methylene-(3,5-di-(tert)-butyl-4-hydrocinnamate)) methane, oxybenzone, sulisobenzone, bisoctrizole, titanium dioxide, zinc oxide, and sterically hindrered phenols such as pentaerythritol tetrakis(3-(3,5-di-tert-butyl-4-hydroxyphenyl)propionate sold as Irganox 1010° by Ciba Specialty Chemicals Inc. of Tarrytown N.Y.

Ink Formulations

The encapsulated thermochromic systems of the present disclosure may be referred to as pigments. In an embodiment of the present disclosure, the pigments are used in formulating photochromic or thermochromic dyes, inks or coatings. In order to add normal pigment to ink, dye, or lacquer, the pigment itself is ground under high shear into the base. This disperses the pigment throughout the base. Since the pigment is usually a solid crystal with a diameter approximating one micron, this grinding is not difficult to do. The eye cannot see particles that size, so the pigment will give the base a solid color. The addition of more pigment intensifies the color. Since the pigment has a very intense color only about 10% of the final ink is made up of normal pigments.

A base for an ink formulation using encapsulated thermochromic systems of the present disclosure may be developed using off the shelf ingredients. The ink will incorporate, where possible, and be compatible with different ink types and solvents with molecular weights larger than 100 while avoiding low molecular weight aldehydes, diols, alcohols, ketones, and, in general, aromatic compounds. Important considerations with respect to the ingredients within the ink vehicle are the reactivity of the ingredients with the encapsulated thermochromic system.

An example of unwanted interactions between media and the encapsulated thermochromic systems can occur between compounds found in ink formulations. The long alkyl chains of many of the compounds found in ink vehicles may have reactive portions that can fit through the pores of the capsule and interact with the inner phase and denature it through this interaction. Since the behavior of the thermochromic system is related to the shape and the location of its molecules at given temperatures, disrupting these structures could have a large impact on the characteristics of the thermochromic system. Even molecules that cannot fit through the capsule pores may have reactive portions that could protrude into the capsule and thereby influence the color transition of the thermochromic system within the capsule. Therefore, ammonia, short chain mineral spirits, acids, ketones, diols, alcohols., ethers and aldehydes are preferably minimized in any medium in which the microencapsulated pigments are also present. If these compounds are substantially reduced or eliminated the thermochromic systems will perform better and have a longer shelf life.

Another step in using the encapsulated thermochromic systems of the present disclosure in ink formulations is to adjust the pH or lower the acid value of the ink base before the thermochromic system is added. This can be done by ensuring that each individual component of the base is at the correct pH or acid value or by simply adding a proton donor or proton acceptor to the base itself prior to adding the thermochromic system. The appropriate specific pH is generally neutral, or 7.0. The pH will vary between 6.0 and 8.0 depending on the ink type and the color and batch of the thermochromic system.

Once a slurry and the base have been properly prepared, they are combined. The method of stirring should be low speed with non-metal stir blades and other manufacturing equipment known to those skilled in the art of ink making. Other additives may be incorporated to keep the thermochromic system suspended. The ink should be stored at or slightly below room temperature.

Most thermochromic inks or coatings undergo a color change from a specific color to colorless. Therefore, layers of background colors can be provided under thermochromic layers that will only be seen when the thermochromic layer changes to colorless. Alternatively, a base color may be added to the thermochromic ink or coating, such that the background color is that of the base color, as opposed to being colorless. If an undercoat of yellow is applied to the substrate and then a layer containing blue thermochromic dye is applied the color will appear to change from green to yellow, when what is really happening is that the blue is changing to colorless.

Where the pigment is photochromic in nature, it will be appreciated also that a base color may be added to the photochromic inks or coatings. Multichromatic inks or coatings may be made by combining photochromic and thermochromic materials. This may be done by mixing thermochromic pigments and photochromic materials that have been separately microencapsulated, or else the photochromic dye and thermochromic dye (together with other additives) may be combined for use in the internal phase at the time of microencapsulation.

In an embodiment, thermochromic systems of the present disclosure formulated as dyes or inks may be used for the printing of identification or forgery detection marks or patterns on security documents. These inks may also be used simultaneously with conventional printing inks and also may be used with pre-existing printers by substitution with one of the normally used printing inks.

In one embodiment, a thermochromic coating formulation includes:

| Ingredient | Weight Percent of Coating |
|---|---|
| Pigment* | 1% to 40% |
| Vehicle | |
| Polymerizable resin | 5% to 30% |
| Dispersing agent | 0% to 5% |
| Solvent | 0% to 50% |
| Curing agent | 0% to 25% |
| Wax | 0% to 5% |

*Assessed by solids content upon complete drying of pigment capsules, but does not need to be dried and may be mixed as a slurry.

In one aspect, a reversible thermochromic coating for use in can and coil coatings contains a reversible thermochromic pigment in an amount from 1% to 40% by weight of the coating, and a vehicle forming the balance of the coating. The vehicle includes a resin selected from the group consisting of epoxy, polyester, urethane, acrylic acid and acrylate resins, and combinations thereof. Commercially available thermochromic systems may be readily obtained in a variety of colors demonstrating color transition temperatures from about minus 5° C. and up to about 65° C. A range of color formulations may be made by mixing the pigment to include one or more of the following reversible thermochromic colors: yellow, magenta, cyan, and black. These may be further mixed to include other dyes or solid pigments that are non-thermochromic in nature. The pigment may change from a colorless state to a colored state upon cooling to the reactive temperature, or to a colored state upon heating to the reactive temperature. It is preferred that the microcapsules are formed of urea-formaldehyde or melamine-formaldehyde that is acid catalyzed to enhance the inherent stability in polar, low molecular weight solvents having a molecular weight of about less than 100 g/mol.

When premixed using a nonpolar solvent, the coatings can demonstrate shelf stability exceeding 14 to 45 days when stored at about 20° C. Some coating formulations demonstrate shelf stability in excess of one year.

The curing agent is generally compatible with the resin for this purpose and may be, for example, a latent blocked amine to initiate a polymerization reaction upon heating.

The coating may be roller-coated onto coil stock aluminum or steel and the roll stock aluminum is subsequently formed into one or more beverage can components. These components may be selected from the group consisting of beverage can ends, beverage can tabs, bottle caps, and/or beverage container closures. The aluminum is preferably an alloy that is commonly used in canning operations, such as aluminum alloy 5182-H48. The coatings work well also on other metals including, without limitation, steel and plate steel. The coating process preferably occurs in one or more coats to yield a dried film with a thickness ranging from 1 mg/in$^2$ up to 5.5 mg/in$^2$.

Additional applications include using the microencapsulated pigments described herein as chromophores in otherwise conventional formulations for:

Coil metal coatings;

Inkjet inks;

Metal decoration inks;

End printing coatings for use in beverage cans;

Coatings for printing on the crowns of beverage cans;

Coatings for printing on closures of beverage cans, such as screw-on caps;

Coatings used in web offset printing;

Screen printing inks and coatings;

Solvent based inks and coatings;

Water based inks and coatings;

Oxidation cure coatings;

UV cure coatings;

Electron-beam cured coatings; and

Master batch epoxy coatings in either one part or two part systems.

The various embodiments shown below are nonlimiting in nature, teaching by way of example and not by limitation.

Working Example 1

Large Batch Slurry Process for Small Particle Microcapsules

Sample Batch Formulation:

| Color: | Batch Size: | 60.00 KG | | |
|---|---|---|---|---|
| Green Material | Date: %/Amount | (Kg) | | |
| EMA | 50% | 30.0 KG | 2-7%-EMA in final slurry | |
| Total IP | 30% | 18.0 KG | | |
| Internal Phase | 50% | | Alcohol/Ester | |
| Color former | 1-10% | | Leuco Dye | |
| Developer | 5-30% | | phenolic developer | |
| Additional Additive (curing agent) | | toluene sulfonic acid catalyst | 5-30% by weight of the amine formaldehyde resin. | |
| Additional water | | 6.0 KG | (Added after homogenization - part of aqueous phase) | |
| Resin/Water | 20% | 12.0 KG | High amino amine formaldhyde resin | 6.27 KG |
| | | | Water | 5.73 KG |

An emulsion mixture is prepared from premixtures as described above including: (1) an aqueous solution, (2) an internal phase mixture, and (3) an amine formaldehyde resin.

The aqueous solution was prepared by mixing 30 kg of a commercially available surfactant product including about 5% by weight ethylene maleic anhydride in water. The resulting aqueous solution is maintained at a temperature ranging from 60° C. to 90° C. and contained sufficient EMA to impart about 2.7% by weight EMA in the final emulsion slurry.

The internal phase mixture is a standard mixture for producing a green thermochromic effect and suitably includes 50-80% by weight of an alcohol/ester mixture as the carrier, 1% to 10% by weight of a green-forming leuco dye, and 5% to 30% by weight of a phenolic developer. The internal phase mixture weighs 18 kg, constituting 30% of the emulsion mixture by weight. The internal phase mixture is maintained at a temperature ranging from 120° C. to 130° C.

The amine-formaldehyde resin solution is prepared by mixing 6.27 kg of a commercially available high amino anime formaldehyde resin with 5.73 kg of water. The amine-formaldehyde resin solution was maintained at a temperature ranging from 20° C. to 50° C. The amine formaldehyde solution weighs 12 kg, constituting 20% of the emulsion mixture.

The internal phase solution is poured into the aqueous solution under high shear conditions created by a homogenizer over 2-3 minutes. After a suitable emulsion develops, the amine-formaldehyde solution is poured into the emulsion over 1-2 minutes. At the end of the resin addition, the homogenizer is shut down and removed from the process. A large impeller type mixer iss then engaged to keep the capsules suspended while the capsule walls form. This is done while maintaining a temperature of from 80° C. to 90° C. An additional 6 kg of distilled water is added to the slurry under mixing conditions to reduce high viscosity gelation which occurs after the polymer addition. At this point the emulsion mixture is complete.

A catalyst for polymerizing the resin is optionally next added. The catalyst may be a blocked amine p-toluene sulfonic acid. The catalyst is added in an a mount equal to 5% to 35% by weight of the amine formaldehyde resin. The pH of the resulting mixture was adjusted to about 3.5 to 4 by addition of triethanolamine. Under the high temperature and low pH, the amine formaldehyde resin polymerizes and accumulates as the capsule wall around the internal phase. The resin wall crosslinks into a hardened shell over a period of 2-8 hours while the polymerization reaction occurred at a temperature from 80° C. to 90° C.

Working Example 2

Slurry Processing into a Microencapsulated Pigment for Ink Manufacture

After polymerization, the slurry produced in the foregoing Example 1 has a high kinematic viscosity ranging from 2000 to 4000 centipoise. The slurry is approximately 40% by weight solids including capsules and other materials, together with approximately 60% water. In order to produce a metal decoration ink, the bulk of the water needs to be removed from the liquid slurry, thus reducing the amount of water from 60% by weight percentage to a percentage of from 1% to 50% by weight.

Dewatering is to be accomplished by filtration, and may be assisted by chemical additives as are known to the art. Further dewatering may be accomplished by introducing the filtered slurry into a jacketed vacuum mixer, which is maintained at elevated temperature under high vacuum condition. During the vacuum drying process the slurry is continuously mixed to expose surface area to accelerate the drying process. The slurry is, for example, dewatered to a concentration of 5% to 35% moisture. A final pigment is then suitable for processing into a metal decorating ink capable of withstanding a high temperature oven cure without extreme color loss. The ink also had improved transfer rheology without severe misting in high speed production lines.

Working Example 3

Various Coating Formulations

The following formulations use the presscake pigment from Example 1, which may be dispersed into the resin vehicle system using a 3-roll mill and processed into a metal decoration ink. In one example of this, a roll milling process disperses the pigment into the ink vehicle for application as a metal decoration ink which is oven cured at a temperature of 200-230 C for a time of 2-3 minutes.

Two Part Epoxy Coating
Part A (30% by weight of coating)
Thermochromic pigment (any color)*
  * This material may be purchased on commercial order from Chromatic Technologies, Inc. of Colorado Springs Colo., and may include for example S5BOXX3105W, a blue thermochromic slurry that goes from a colored to colorless state when the temperature exceeds 31° C.
Part B (70% by weight of coating)
Clear Coating (an epoxy coating available from Watson Standard of Pittsburgh, Pa.)
Two Part Epoxy Coating
Part A (60% by weight of coating)
45% Thermochromic Pigment (any color)*
  * This material may be purchased on commercial order from Chromatic Technologies, Inc. of Colorado Springs Colo., and may include for example S5BOXX3105W, a blue thermochromic slurry that goes from a colored to colorless state when the temperature exceeds 31° C.
50% Epoxy resin (for example Epon 863 available from Lawter of LaVergne, Tenn.)
3.3% Dispersing aid (for example Disperbyk 2025 available from Byk of Wallingford, Conn.)
1.7% Curing agent (for example Ancamine 2458 available from Air Products of Allentown, Pa.)
Part B (40% by weight of coating)
85% Clear Coating (an epoxy coating available from Watson Standard of Pittsburgh, Pa.)
15% Solvent to reduce viscosity (for example, butyl carbitol acetate, xylenes, or methyl isobutyl ketone)
One Part Polyester Coating
20% (w/w) Thermochromic Pigment (any color)*
13% Polyester resin (for example, Decotherm 290 available from Lawter of LaVergne, Tenn.)
0.5% (w/w) Dispersing aid (for example, Byk 370 available from Byk of Wallingford, Conn.)
7% (w/w) Curing agent 1 (for example, Cymel 328 available from Cytec Industries of Woodland Park, N.J.)
1.5% (w/w) Curing agent 2 (for example, imidazole available from Aldrich of St. Louis, Mo.)
2% (w/w) Wax (for example, Fluoron 735 available from Lawter of LaVergne, Tenn.)
30% (w/w) Solvent (for example, ethyl-3-ethoxypropionate available from Univar of Redmond, Wash.)
26% (w/w) Clear Coating (an epoxy coating available from Watson Standard of Pittsburgh, Pa.)
One Part Epoxy Coating
15% (w/w) Thermochromic Pigment (any color)*
10% (w/w) Resin (for example, Epon 896 available from Lawter of LaVergne, Tenn.)
1.5% (w/w) Dispersing aid (for example, Disperbyk 112 available from Byk of Wallingford, Conn.)
0.5% (w/w) Curing agent 1 (for example, Nacure 2500 available from King Industries of Norwalk, Conn.)
4% (w/w) Curing agent 2 (for example, Cymel 325 available from Cytec Industries of Woodland Park, N.J.)
1.5% (w/w) Wax—0.5 wt % (for example, Ultrapoly 211A available from Lawter of LaVergne, Tenn.)
5% (w/w) Solvent 1 (for example, Heloxy Modifier 62 available from Lawter of LaVergne, Tenn.)
21.5% (w/w) solvent 2 (for example, ethyl-3-ethoxypropionate available from Univar of Redmond, Wash.)
41% (w/w) Clear Coating (an epoxy coating available from Watson Standard of Pittsburgh, Pa.)
Inkjet Ink

| Ingredient | Weight % |
| --- | --- |
| Thermochromic Pigment Slurry (20% water) | 30% |
| Glycerol | 10% |
| 1,2-hexanediol | 2% |
| 1,2-propanediol | 0.4% |
| Tripropylene glycol methyl ether | 2% |
| Trimethylol propane | 5% |
| Surfynol 104E | 0.5% |
| Deionized water | balance |
|  | 100.0% |

It will be appreciated also that the thermochromic pigments described herein may be used in place of other pigments reported for use in ink jet printer inks, for example, as described in U.S. Pat. No. 6,132,501 issued to Scaringe et al. and U.S. Pat. No. 7,354,962 issued to Akers et al.

Accordingly, it is to be understood that the embodiments of the disclosure herein described are merely illustrative of the application of the principles of the disclosure. Reference herein to details of the illustrated embodiments is not intended to limit the scope of the claims, which themselves recite those features regarded as essential to the disclosure.

We claim:

1. A microcapsule-based pigment comprising microcapsules having a mean by volume particle size diameter of less than 1 micron, the microcapsules having a wall made of a cured amine formaldehyde resin with the wall encapsulating an internal phase including a thermochromic system; the microcapsule-based pigment being in a reacted form produced from a water-based slurry utilizing
   (1) an aqueous phase solution constituting from 40% to 70% of the slurry by weight, wherein from 1% to 10% of the aqueous phase solution is an anionic surfactant material;
   (2) an internal phase mixture constituting from 23% to 35% of the slurry by weight, wherein from 1% to 10% by weight of the internal phase is a leuco dye and from 5% to 30% is a developer for the leuco dye; and
   (3) an amine formaldehyde resin solution constituting from 15% to 28% of the slurry by weight of which from 40% to 60% is the amine formaldehyde resin itself;
   the anionic surfactant as an emulsifier being present in an effective amount to achieve the mean by volume particle size diameter of less than one micron in a water-based emulsion, and a chemical dewatering agent in an effective amount to facilitate dewatering of the microcapsules with the anionic surfactant in place; a microencapsulated pigment being in a dewatered state of reduced moisture made ready for industrial use facilitated by addition of the chemical dewatering agent the anionic surfactant and the chemical dewatering agent being present in the pigment.

2. The pigment of claim 1, wherein ninety percent of all microcapsules in the pigment have an average particle diameter of less than 1.5 microns.

3. The pigment of claim 1, wherein ninety percent of all microcapsules in the pigment have an average particle diameter of less than 1.0 microns.

4. An ink comprising the pigment of claim 1, dispersed in an ink vehicle.

5. The ink of claim 4, wherein the ink is formulated as an inkjet ink.

6. A coating comprising the pigment of claim 1, dispersed in a coating vehicle.

7. The coating of claim 6, wherein the coating is formulated as a metal decoration coating.

8. The pigment of claim 1, wherein the thermochromic system achieves a blue color when in a color-activated state.

9. The pigment of claim 1, wherein ninety percent of all microcapsules in the pigment have an average particle diameter of less than 1.5 microns.

10. The coating of claim 9, wherein the coating is formulated as a metal decoration coating.

11. The pigment of claim 1, wherein ninety percent of all microcapsules in the pigment have an average particle diameter of less than 1.0 microns.

12. An ink comprising the pigment of claim 8 dispersed in an ink vehicle.

13. A coating comprising the pigment of claim 8 dispersed in a coating vehicle.

14. The pigment of claim 1, wherein the thermochromic system achieves a green color when in a color-activated state.

15. The pigment of claim 1, wherein the thermochromic system achieves a yellow color when in a color-activated state.

16. The pigment of claim 1, wherein the thermochromic system achieves a cyan color when in a color-activated state.

17. The ink of claim 16, wherein the ink is formulated as an inkjet ink.

18. The pigment of claim 1, wherein the microcapsules have a wall made of a cured amine formaldehyde resin, and the wall encapsulates an internal phase including a photochromic material.

19. The pigment of claim 1, wherein the emulsifier is selected from the group consisting of polystyrenesulfonate, styrene copolymers, polyvinylsulfonatester salts, polyvinylsulfonates, maleic anhydridestyrene copolymer, maleic anhydride-isobutylene copolymer, maleic anhydride-ethylene copolymer, maleic anhydride-methyl vinyl ether copolymer, polyvinyl alcohol (saponified product), carboxymethyl-modified polyvinyl alcohol, gum arabic, polyacrylates, polyacrylate derivatives, acrylate copolymers, carboxymethyl cellulose, gelatin, pectin, pullulan, phtahalated gelatin, succinated gelatin, cellulose sulfate ester salt, and alginic acid.

20. The pigment of claim 1, wherein the emulsifier includes ethylene maleic anhydride.

21. The pigment of claim 1 containing from 5% to 35% moisture.

* * * * *